United States Patent
Breitfeld et al.

(10) Patent No.: US 12,553,783 B2
(45) Date of Patent: Feb. 17, 2026

(54) MAGNETOELASTIC TORQUE SENSOR WITH EXTENDED COMPENSATION FOR INTERFERENCE FIELDS

(71) Applicant: Robert Bosch GmbH, Stuttgart (DE)

(72) Inventors: Andreas Breitfeld, Stuttgart (DE); Christoph Ossmann, Reutlingen (DE); Frank Schatz, Kornwestheim (DE); Michael Zegowitz, Tuebingen (DE); Sven Schickle, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 116 days.

(21) Appl. No.: 18/041,000

(22) PCT Filed: Oct. 25, 2021

(86) PCT No.: PCT/EP2021/079461
§ 371 (c)(1),
(2) Date: Feb. 8, 2023

(87) PCT Pub. No.: WO2022/090117
PCT Pub. Date: May 5, 2022

(65) Prior Publication Data
US 2023/0266185 A1 Aug. 24, 2023

(30) Foreign Application Priority Data
Oct. 30, 2020 (DE) ................. 10 2020 213 669.6

(51) Int. Cl.
*G01L 3/10* (2006.01)
*B62J 45/411* (2020.01)
(Continued)

(52) U.S. Cl.
CPC ............. *G01L 3/102* (2013.01); *B62J 45/411* (2020.02); *B62J 45/421* (2020.02); *B62M 6/50* (2013.01)

(58) Field of Classification Search
CPC ....... G01L 3/102; B62J 45/421; B62J 45/411; B62M 6/50
See application file for complete search history.

(56) References Cited

U.S. PATENT DOCUMENTS

| 4,989,460 A | 2/1991 | Mizuno et al. |
| 5,591,925 A * | 1/1997 | Garshelis ............. H10N 35/101 324/207.13 |

(Continued)

FOREIGN PATENT DOCUMENTS

| DE | 102018118174 A1 * | 1/2020 |
| EP | 2799827 A1 | 11/2014 |

(Continued)

OTHER PUBLICATIONS

1 International Search Report for PCT/EP2021/079461, Issued Feb. 3, 2022.

*Primary Examiner* — Octavia Hollington
(74) *Attorney, Agent, or Firm* — NORTON ROSE FULBRIGHT US LLP

(57) ABSTRACT

A magnetoelastic torque sensor having an evaluation unit and at least three magnetic field sensors. The evaluation unit acquires at least one measurement signal of a first magnetic field sensor, at least one measurement signal of a second magnetic field sensor and at least one third measurement signal of a third magnetic field sensor of the magnetoelastic torque sensor, and to determine a torque exerted on the shaft using the at least one measurement signal of the first magnetic field sensor, the at least one measurement signal of the second magnetic field sensor, the at least one measurement signal of the fourth magnetic field sensor, and a ratio of a distance between the second magnetic field sensor and the third magnetic field sensor in an axial direction to a distance between the first magnetic field sensor and the second magnetic field sensor in the axial direction.

18 Claims, 7 Drawing Sheets

(51) Int. Cl.
*B62J 45/421* (2020.01)
*B62M 6/50* (2010.01)

(56) References Cited

U.S. PATENT DOCUMENTS

| | | | | |
|---|---|---|---|---|
| 7,124,649 | B2* | 10/2006 | May | G01L 3/105 73/862.331 |
| 8,001,849 | B2* | 8/2011 | Weng | G01L 3/105 73/862.333 |
| 8,578,794 | B2* | 11/2013 | Lee | G01R 33/07 73/862.331 |
| 9,683,906 | B2* | 6/2017 | Gießibl | B65D 19/44 |
| 10,151,652 | B2* | 12/2018 | Gießibl | G01D 5/24423 |
| 11,486,776 | B2* | 11/2022 | Simard | G01L 5/0023 |
| 12,025,521 | B2* | 7/2024 | Veillette | G01L 5/221 |
| 2010/0242626 | A1 | 9/2010 | Weng | |
| 2011/0162464 | A1* | 7/2011 | Weng | G01L 3/102 73/862.333 |
| 2013/0125669 | A1 | 5/2013 | Barraco et al. | |
| 2022/0214239 | A1* | 7/2022 | Neuschaefer-Rube | G01R 33/091 |

FOREIGN PATENT DOCUMENTS

| | | |
|---|---|---|
| JP | 2018523124 A | 8/2018 |
| WO | 2018109674 A1 | 6/2018 |

* cited by examiner

MAGNETOELASTIC TORQUE SENSOR WITH EXTENDED COMPENSATION FOR INTERFERENCE FIELDS

FIELD

The present invention relates to a magnetoelastic torque sensor and to a vehicle, in particular a vehicle that can be driven electrically and/or by muscular force, having a magnetoelastic torque sensor. In addition, the present invention relates to a method for determining a torque using a magnetoelastic torque sensor.

BACKGROUND INFORMATION

A magnetoelastic torque sensor having a partially magnetized shaft has been available for years. When a torque load is applied to the shaft, a magnetic field arises in the area outside the shaft that is at each point proportional to the torque exerted on the shaft and that can be measured by magnetic field sensors of the torque sensor. Therefore, the measurement of the magnetic field enables the determination of the torque. However, an ideal torque measurement is thus only possible if no other magnetic fields are present that were not produced by the torque. In this respect, from the related art, magnetoelastic torque sensors each have a shaft with two magnetized regions for the compensation of homogeneous magnetic interference fields, or a shaft with three magnetized regions for the compensation of linear magnetic interference fields.

SUMMARY

A magnetoelastic torque sensor according to the present invention may have the advantage that it enables a space-saving interference field-compensated flux or torque measurement. According to an example embodiment of the present invention, this may be achieved in that in the magnetoelastic torque sensor, which has at least three magnetic field sensors, the spacings, and in particular a ratio of the spacings, of the magnetic field sensors enters into the flux or torque measurement. By taking into account the spacings of the magnetic field sensors relative to each other and through corresponding weighting or scaling of the measurement signals of the magnetic field sensors, the measurement signals can be combined in such a way that homogeneous interference fields and linear interference field gradients are eliminated in the calculation of the torque. For this purpose, the magnetoelastic torque sensor has a shaft having at least one magnetized region, the shaft having an axial direction and a radial direction, at least three magnetic field sensors that each have at least one measurement axis and are set up to acquire a component of a magnetic flux density of a magnetic field in the direction of the at least one measurement axis, and an evaluation unit. The at least three magnetic field sensors include a first magnetic field sensor, a second magnetic field sensor, and a third magnetic field sensor. Here the second magnetic field sensor is situated, in the axial direction, between the first magnetic field sensor and the third magnetic field sensor. At least one magnetic field sensor of the at least three magnetic field sensors is situated relative to the at least one magnetized region such that the magnetic field sensor is set up to acquire a component of a magnetic flux density of a magnetic field in the direction of the respective at least one measurement axis, which field can be produced by the at least one magnetized region when the shaft is subjected to a torque load. The evaluation unit is set up to acquire at least one measurement signal of the first magnetic field sensor, at least one measurement signal of the second magnetic field sensor, and at least one measurement signal of the third magnetic field sensor, and to determine a torque exerted on the shaft based on the at least one measurement signal of the first magnetic field sensor, the at least one measurement signal of the second magnetic field sensor, the at least one third measurement signal, and a ratio of a distance between the second magnetic field sensor and the third magnetic field sensor in the axial direction to a distance between the first magnetic field sensor and the second magnetic field sensor in the axial direction. The proposed magnetoelastic torque sensor can calculate the measurement signals of the at least three magnetic field sensors, in particular by taking into account the described distance ratio in the determination of the torque, in such a way that in particular homogeneous interference fields and linear interference field gradients in the axial direction can be compensated. In this way, the calculation is achieved of a torque largely cleared of interference fields, free both of homogeneous interference field portions and of linear interference field gradients in the axial direction. In addition, in the present invention it is advantageous that in order to eliminate/compensate homogeneous interference fields and linear interference field gradients, no approximations need to be made in the calculation of the torque. Since no approximations are required, an accurate determination of the torque can be achieved. A significant advantage of the present invention is that interference field elimination/compensation can already be realized by a magnetoelastic torque sensor with a shaft having only one magnetized region or only two magnetized regions. Since a magnetized region must have a minimum width in order to able to be magnetized in a stable and reproducible manner, and the transition from one magnetized region to another magnetized region can never occur abruptly, the omission of an additional magnetized region or of two additional magnetized regions results in a significant reduction in the constructive size of the magnetoelastic torque sensor in the axial direction. Another advantage of the proposed magnetoelastic torque sensor is that homogeneous interference fields and linear interference field gradients in the axial direction can be calculated and monitored. In addition, the use of at least four sensors offers the further advantage of eliminating certain nonlinear interference field gradients in the axial direction, or reducing the error that occurs due to them.

Preferred developments of the present invention are disclosed herein.

Preferably, at least two magnetic field sensors of the at least three magnetic field sensors, in particular the at least three magnetic field sensors, are situated relative to the at least one magnetized region in such a way that the at least two magnetic field sensors, in particular the at least three magnetic field sensors, are set up to acquire in each case a component of a magnetic flux density of a magnetic field in the direction of the respective at least one measurement axis, which field can be produced by the at least one magnetized region when the shaft is subjected to a torque load.

In particular, the shaft can be designed as a hollow shaft. The magnetic flux density of the magnetic field that can be produced by the at least one magnetized region of the shaft when the shaft is subjected to a torque load is, at each location, proportional to the torque applied to the shaft. In the context of the present invention, this magnetic field may also be referred to as the useful field.

In the case of a magnetic interference field in the vicinity of the shaft or the magnetoelastic magnetic sensor, the magnetic field, whose magnetic flux density can be acquired by the at least three magnetic field sensors, includes a magnetic field (useful field) produced by the at least one magnetized region when there is a torque load on the shaft, and includes the magnetic interference field. Here, a measurement signal of a respective magnetic field sensor includes a magnetic flux density of the useful field proportional to the torque applied to the shaft, and the magnetic flux density of the superimposed magnetic interference field at the position of the respective magnetic field sensor. If there is no magnetic interference field in the vicinity of the shaft or of the magnetoelastic magnetic sensor, a measurement signal of a respective magnetic field sensor when there is a torque load on the shaft includes only the magnetic flux density, proportional to the torque, of the produced useful field at the position of the respective magnetic field sensor.

In particular, the at least one measurement signal of the first magnetic field sensor, the at least one measurement signal of the second magnetic field sensor, and the at least one measurement signal of the third magnetic field sensor are offset-corrected measurement signals. Offset correction is advantageously performed in a torque-free and interference-field-free state.

The named interference field compensation properties (of the torque calculation) are fully maintained, independently of initial positioning tolerances of the entirety/assembly of the at least three magnetic field sensors relative to the shaft, and thus also independently of initial magnetization tolerances of the at least one magnetized region of the shaft. The reason for this is based in the present invention.

The present invention permits all sensors to see arbitrary (and thus also different) (but proportional to the torque) useful fields, and two sensors do not have to see the same useful field to fulfill the purpose.

It is to be noted that in the context of the present invention, the magnetoelastic torque sensor may also be referred to as a magnetoelastic torque sensor system. Accordingly, the magnetic field sensors within the scope of the present invention may also be referred to as magnetic field sensor elements.

In particular, the shaft may also be referred to as a magnetoelastic shaft in the context of the present invention. "Magnetoelastic" means that the occurrence of a mechanical tension in the shaft due to a mechanical loading of the shaft causes a change in its magnetization. In other words, the magnetoelastic torque sensor is based on the inverse magnetostrictive effect.

In particular, the formulation that the shaft has an axial direction means that the shaft extends in the axial direction.

According to an example embodiment of the present invention, the magnetoelastic torque sensor can preferably be designed or manufactured as a single unit, all components of the torque sensor or the magnetic field sensors, the shaft, and the evaluation unit being situated in a single housing. Alternatively, at least three magnetic field sensors, a shaft (magnetoelastic shaft) having at least one magnetized region, and the above-described evaluation unit may be combined with one another in order to act as a magnetoelastic torque sensor according to the present invention, without housing these components in a single housing.

According to a preferred embodiment of the present invention, the at least one measurement axis of the first magnetic field sensor and/or the at least one measurement axis of the second magnetic field sensor and/or the at least one measurement axis of the third magnetic field sensor may each include a measurement axis that is parallel in the axial direction or the radial direction of the shaft. Here, the at least one measurement signal of the first magnetic field sensor can include a first measurement signal that corresponds to a component of the magnetic flux density of the magnetic field in the axial direction or the radial direction of the shaft at the position of the first magnetic field sensor, and/or the at least one measurement signal of the second magnetic field sensor can include a second measurement signal that corresponds to a component of the magnetic flux density of the magnetic field in the axial direction or the radial direction of the shaft at the position of the second magnetic field sensor, and/or the at least one measurement signal of the third magnetic field sensor includes a third measurement signal that corresponds to a component of the magnetic flux density of the magnetic field in the axial direction or the radial direction of the shaft at the position of the third magnetic field sensor.

According to an alternative embodiment of the present invention, the at least one measurement axis of the first magnetic field sensor and/or the at least one measurement axis of the second magnetic field sensor and/or the at least one measurement axis of the third magnetic field sensor can each include two or three measurement axes oriented orthogonally to one another. In this case, the at least one measurement signal of the first magnetic field sensor can include two or three measurement signals, and/or the at least one measurement signal of the second magnetic field sensor can include two or three measurement signals, and/or the at least one measurement signal of the third magnetic field sensor can include two or three measurement signals, it being possible to determine a component of the magnetic flux density of the magnetic field in the axial direction or the radial direction of the shaft at the respective position of the magnetic field sensor from the two or three measurement signals of a respective magnetic field sensor. The determination of the component of the magnetic flux density of the magnetic field in the axial direction or the radial direction of the shaft at the respective position of the magnetic field sensor can preferably be carried out by the evaluation unit.

In particular, the at least three magnetic field sensors can preferably each have one axis or a plurality of axes, in particular three axes, the at least three magnetic field sensors advantageously being situated on a straight line that is parallel to the axial direction, and at least one measurement axis of a respective magnetic field sensor being oriented in the axial direction. Alternatively, at least one measurement axis of a respective magnetic field sensor is oriented in the radial direction. Alternatively, two measuring axes of a respective magnetic field sensor are oriented orthogonally to each other and orthogonally to the radial direction, so that the component of the magnetic flux density of a magnetic field in the axial direction can be determined from them in each case. Alternatively, three measuring axes of a respective magnetic field sensor are oriented orthogonally to each other, so that the components of the magnetic flux density of a magnetic field in the axial direction and/or the radial direction can be determined from them respectively, the orientation of a respective magnetic field sensor being freely selectable. It should be noted that magnetic field sensors having one axis are sufficient for the elimination of homogeneous interference fields and linear interference field gradients. By enabling the use of magnetic field sensors having one axis, a magnetoelastic torque sensor can be realized at a lower overall cost. For example, the magnetic field sensors can be flux-gate coils, which are extremely low in cost. The use of multi-axis magnetic field sensors, which have the advantage of providing additional information, enables supplementary monitoring functions of the magnetoelastic torque sensor.

Preferably, according to an example embodiment of the present invention, the evaluation unit is set up to additionally use a sensitivity of the magnetoelastic torque sensor to determine the torque exerted on the shaft. In other words, the evaluation unit is set up to determine the torque applied to the shaft using the at least one measurement signal of the first magnetic field sensor, the at least one measurement signal of the second magnetic field sensor, the at least one measurement signal of the third magnetic field sensor, the ratio of the distance between the second magnetic field sensor and the third magnetic field sensor in the axial direction to the distance between the first magnetic field sensor and the second magnetic field sensor in the axial direction, and a sensitivity of the magnetoelastic torque sensor. The sensitivity of the magnetoelastic torque sensor is understood as the change in the value of the output variable, i.e. the torque, in relation to the change in the value of the input variable, i.e. the magnetic flux density, that causes it. In particular, the sensitivity of the magnetoelastic torque sensor may also be referred to as the overall sensitivity in the context of the present invention.

Preferably, the evaluation unit is set up to determine the torque exerted on the shaft using the equation $$M = \left[ (B_{SE2} - B_{SE3}) - \frac{d_{23}}{d_{12}} \times (B_{SE1} - B_{SE2}) \right] \times s_{13}. \quad (1)$$

Here:
M is the torque to be determined in "Nm,"
$B_{SE1}$ is the component of the magnetic flux density of the magnetic field in the axial direction or in the radial direction at the position of the first magnetic field sensor in "µT,"
$B_{SE2}$ is the component of the magnetic flux density of the magnetic field in the axial direction or in the radial direction at the position of the second magnetic field sensor in "µT,"
$B_{SE3}$ is the component of the magnetic flux density of the magnetic field in the axial direction or in the radial direction at the position of the third magnetic field sensor in "µT,"
$d_{12}$ is the distance between the first magnetic field sensor and the second magnetic field sensor in "mm,"
$d_{23}$ is the distance between the second magnetic field sensor and the third magnetic field sensor in "mm,"
and $s_{13}$ is the sensitivity of the magnetoelastic torque sensor in "Nm/µT."

The proposed equation (1) and, in particular, the difference formation contained therein can eliminate homogeneous interference fields and linear interference field gradients, thus enabling an accurate determination of the torque based on the measurement signals of the first magnetic field sensor, the second magnetic field sensor and the third magnetic field sensor.

According to a further preferred embodiment of the present invention, the evaluation unit is set up to determine the torque exerted on the shaft using the equation $$M = \left[ (B_{SE2} - B_{SE3}) - k \times \frac{d_{23}}{d_{12}} \times (B_{SE1} - B_{SE2}) \right] \times s_{13} \quad (2)$$

with k≠1,
in particular with 0.95≤k<1 or 1<k≤1.1.
Here:
M is the torque to be determined in "Nm,"
$B_{SE1}$ is the component of the magnetic flux density of the magnetic field in the axial direction or in the radial direction at the position of the first magnetic field sensor in "UT,"
$B_{SE2}$ is the component of the magnetic flux density of the magnetic field in the axial direction or in the radial direction at the position of the second magnetic field sensor in "µT,"
$B_{SE3}$ is the component of the magnetic flux density of the magnetic field in the axial direction or in the radial direction at the position of the third magnetic field sensor in "µT,"
$d_{12}$ is the distance between the first magnetic field sensor and the second magnetic field sensor in "mm,"
$d_{23}$ is the distance between the second magnetic field sensor and the third magnetic field sensor in "mm",
$s_{13}$ is the sensitivity of the magnetoelastic torque sensor in "Nm/UT," and
k is a predetermined weighting factor by which, in the presence of nonlinear interference field portions, an error caused by the nonlinear interference field portions can be reduced, when determining the torque, by a nonlinear interference field gradient in the vicinity of the shaft or of the magnetoelastic torque sensor which is always formed in the same way.

In other words, by introducing the weight factor "k" into the torque determination according to the proposed equation (2), it is possible to deviate from the distance ratio $d_{23}/d_{12}$ in such a way that, in the case of interference fields with nonlinear portions in the vicinity of the shaft or of the magnetoelastic torque sensor, an error caused by the nonlinear interference field portions can be reduced. This is especially true in a target application where the nonlinear interference field gradients in the region of the magnetoelastic torque sensor are always realized in the same manner. However, in applications with variable location and environment, in which the assumption of a nonlinear interference field gradient that is always realized in the same manner is inaccurate because variable formations of the interference field gradient can occur, the error caused in the torque calculation can turn out to be larger than in equation (1), so that in such applications the largest possible error can be further reduced with equation (2).

The weighting factor k can be selected or predetermined in an application-specific manner.

A fine adjustment of the weighting factor k would be realizable here via the mathematical optimization approach dMSE(k)/dk=0 for the (weighted) minimization of the mean square error (MSE). For example, the "0 Nm" point could be optimized to a minimum error over a certain range of scenarios with different interfering influences, or also only one interference field scenario could be optimized.

If only homogeneous interference fields and/or interference fields with linear portions and/or only negligible nonlinear interference field portions are present in the region of the magnetoelastic torque sensor, or only such interference fields are expected in an application, then, between the equations (1) and (2), equation (1) is also to be preferred for determining a torque acting on the shaft of the magnetoelastic torque sensor, as in the case of use in applications that are variable in location and environment, in which a non-linear interference field gradient that is always formed in the same manner cannot be guaranteed.

It is to be noted, however, that even with equation (1), a torque acting on the shaft can be determined with sufficient accuracy, even in the case of an interference field with nonlinear portions present in the vicinity of the shaft. The advantage of equation (1) is that the linear interference field portions are fully compensated, independently of the application and operating environment. Since in general the nonlinear portions are small compared to the homogeneous and linear portions, the error due to nonlinear portions in equation (1) is already so small that the torque can be determined with sufficient/high accuracy.

In particular differing from equation (1), equation (2) no longer aims at compensating all interference field scenarios as completely as possible (homogeneous and linear portions), but enables an optimization for one or a few similar interference field scenarios that can be compensated better than with equation (1), because non-linear portions are in part also compensated. Here, interference field scenarios other than those to which optimization took place would result in a larger error than would be the case with equation (1). Also all interference field scenarios "without" nonlinear portions can advantageously be compensated with equation (1) without errors.

In the application of the magnetoelastic torque sensor in a vehicle, in particular in a vehicle that can be operated electrically and/or with muscular force, in particular in an electric bicycle, various clearly different interference field scenarios occur during operation solely due to the change of location during travel (the operating environment does not stay the same), so that an optimization for this diversity results in k=1 (as in equation (1)) or, with weighted optimization of individual interference field scenarios, a k≠1 results, the maximum possible error then being larger with equation (2). For this reason, equation (1) is more advantageous for the application already described. In other applications with a constant interference field scenario, or scenarios that do not differ as greatly, equation (2) may be more advantageous.

Advantageously, the sensitivity of the magnetoelastic torque sensor is determined by two-point calibration free of interference fields and after offset correction. In particular, the sensitivity for equation (1) is determined according to the following equation:

$$s_{13} = (M_2 - M_1)/ \tag{3a}$$
$$\left( \left[ (B_{SE2}(M_2) - B_{SE3}(M_2)) - \frac{d_{23}}{d_{12}} \times (B_{SE1}(M_2) - B_{SE2}(M_2)) \right] \ldots - \right.$$
$$\left. \left[ (B_{SE2}(M_1) - B_{SE3}(M_1)) - \frac{d_{23}}{d_{12}} \times (B_{SE1}(M_1) - B_{SE2}(M_1)) \right] \right)$$

In particular, the sensitivity for equation (2) is determined according to the following equation:

$$s_{13} = (M_2 - M_1)/ \tag{3b}$$
$$\left( \left[ (B_{SE2}(M_2) - B_{SE3}(M_2)) - k \times \frac{d_{23}}{d_{12}} \times (B_{SE1}(M_2) - B_{SE2}(M_2)) \right] \ldots - \right.$$
$$\left. \left[ (B_{x,SE2}(M_1) - B_{SE3}(M_1)) - k \times \frac{d_{23}}{d_{12}} \times (B_{SE1}(M_1) - B_{SE2}(M_1)) \right] \right)$$

Here:
$M_1$ is the torque in "Nm" at the first point of the two-point calibration, $M_2$ is the torque "Nm" at the second point of the two-point calibration, $B_{SEa}(Mb)$ is the measured measurement signal of the magnetic sensor "a" in "µT" at the point "b" of the two-point calibration with a=1 for the first magnetic field sensor, a=2 for the second magnetic field sensor and a=3 for the third magnetic field sensor, and b=1 for the first point and b=2 for the second point of the two-point calibration, $d_{12}$ is the distance between the first magnetic field sensor and the second magnetic field sensor in "mm," and $d_{23}$ is the distance between the second magnetic field sensor and the third magnetic field sensor in "mm"

k is a predetermined weighting factor by which, in the presence of nonlinear disturbance field portions, an error caused by the nonlinear disturbance field portions can be reduced, when determining the torque, by a nonlinear disturbance field gradient in the vicinity of the shaft or of the magnetoelastic torque sensor which is always formed in the same way.

It is to be noted that the notation " . . . " in the above equation means that the equation continues in the next line. In the context of the present invention, this relates to all equations that include the notation " . . . " The standard order of the operators applies to the calculation operations.

The following equations (1b) and (1c) are equivalent to equation (1) and are obtained from equation (1) by transformation:

$$M = \left[ (B_{SE1} - B_{SE2}) - \frac{d_{12}}{d_{23}} \times (B_{SE2} - B_{SE3}) \right] \times s_{13b} \text{ with } s_{13b} = \tag{1b}$$
$$-s_{13} \times \frac{d_{23}}{d_{12}}$$

$$M = \left[ (B_{SE1} - B_{SE3}) \times \frac{d_{23}}{d_{12} + d_{23}} - (B_{SE2} - B_{SE3}) \right] \times s_{13c} \text{ with } s_{13b} = \tag{1c}$$
$$-s_{13} \times \frac{d_{12} + d_{23}}{d_{12}}$$

Preferably, the first magnetic field sensor, the second magnetic field sensor, and the third magnetic field sensor are situated relative to each other and to the at least one magnetized region such that one of the following two conditions is satisfied:

$$\left| (N_{SE2} - N_{SE3}) - \frac{d_{23}}{d_{12}} \times (N_{SE1} - N_{SE2}) \right| > 0 \text{ µT with } \frac{d_{23}}{d_{12}} \leq 1 \tag{4a}$$

$$\left| (N_{SE1} - N_{SE2}) - \frac{d_{12}}{d_{23}} \times (N_{SE2} - N_{SE3}) \right| > 0 \text{ µT with } \frac{d_{12}}{d_{23}} < 1. \tag{4b}$$

In particular, the first magnetic field sensor, the second magnetic field sensor, and the third magnetic field sensor are situated relative to each other and to the at least one magnetized region such that one of the following two conditions is satisfied:

$$\left| (N_{SE2} - N_{SE3}) - \frac{d_{23}}{d_{12}} \times (N_{SE1} - N_{SE2}) \right| > 50 \text{ µT with } \frac{d_{23}}{d_{12}} \leq 1 \tag{5a}$$

$$\left| (N_{SE1} - N_{SE2}) - \frac{d_{12}}{d_{23}} \times (N_{SE2} - N_{SE3}) \right| > 50 \text{ µT with } \frac{d_{12}}{d_{23}} < 1. \tag{5b}$$

Here:
$N_{SE1}$ is a predetermined component of the magnetic flux density in "µT" of a magnetic field produced by the at least one magnetized region at a position of the first magnetic field sensor due to a loading of the shaft with a maximum torque measurable by the magnetoelastic torque sensor, $N_{SE2}$ is a predetermined component of the magnetic flux density in "µT" of a magnetic field produced by the at least one magnetized region at a position of the second magnetic field sensor due to a loading of the shaft with the maximum torque measurable by the magnetoelastic torque sensor, and $N_{SE3}$ is a predetermined component of the magnetic flux density in "µT" of a magnetic field produced by the at least one magnetized region at a position of the third magnetic field sensor due to a loading of the shaft with a maximum torque measurable by the magnetoelastic torque sensor.

The case distinction between $(d_{23}/d_{12}) \leq 1$ and $(d_{12}/d_{23}) < 1$ ensures that the effective overall sensitivity is considered free of artificial upscaling.

Advantageously, the above predetermined magnetic flux densities are offset-corrected and interference-field-free magnetic flux densities.

Preferably, a sum of the distance between the first magnetic field sensor and the second magnetic field sensor in the axial direction and the distance between the second magnetic field sensor and the third magnetic field sensor in the axial direction is greater than or equal to 4 mm and less than 20 mm. In other words, a distance between the first magnetic field sensor and the third magnetic field sensor in the axial direction is preferably greater than or equal to 4 mm and less than 20 mm. In this way, the magnetoelastic torque sensor can be realized so as to be compact in the axial direction. In particular, the at least three magnetic field sensors may include exactly the first magnetic field sensor, the second magnetic field sensor, and the third magnetic field sensor.

Particularly preferably, according to an example embodiment of the present invention, the at least three magnetic field sensors include the first magnetic field sensor, the second magnetic field sensor, the third magnetic field sensor, and a fourth magnetic field sensor. Here, the third magnetic field sensor is situated in the axial direction between the second magnetic field sensor and the fourth magnetic field sensor. The evaluation unit is set up to acquire at least one measurement signal of the fourth magnetic field sensor and to additionally use the at least one measurement signal of the fourth magnetic field sensor and a ratio of a distance between the second magnetic field sensor and the third magnetic field sensor in the axial direction to a distance between the third magnetic field sensor and the fourth magnetic field sensor in the axial direction to determine the torque applied to the shaft. In other words, the evaluation unit is set up to acquire at least one measurement signal of the fourth magnetic field sensor and to determine a torque exerted on the shaft using the at least one measurement signal of the first magnetic field sensor, the at least one measurement signal of the second magnetic field sensor, the at least one measurement signal of the third magnetic field sensor, the at least one measurement signal of the fourth magnetic field sensor, the ratio of the distance between the second magnetic field sensor and the third magnetic field sensor in the axial direction to the distance between the first magnetic field sensor and the second magnetic field sensor in the axial direction, and a ratio of a distance between the second magnetic field sensor and the third magnetic field sensor in the axial direction to a distance between the third magnetic field sensor and the fourth magnetic field sensor in the axial direction. Through the taking into account of the distances of the magnetic field sensors relative to each other, and corresponding weighting or scaling of the measurement signals of the magnetic field sensors, the measurement signals can be combined with each other in such a way that in the calculation of the torque, homogeneous interference fields and linear interference field gradients are eliminated and non-linear interference field gradients are eliminated or minimized, even given use in applications that vary in location and environment in which a non-linear interference field gradient that is always realized in the same way in the environment of the shaft or the magnetoelastic torque sensor cannot be guaranteed.

In particular, the measurement signal of the fourth magnetic field sensor is an offset-corrected measurement signal. Offset correction is advantageously performed in a torque-free and interference-field-free state.

The at least one measurement axis of the fourth magnetic field sensor preferably includes a measurement axis parallel in the axial direction or the radial direction of the shaft, the at least one measurement signal of the fourth magnetic field sensor including a fourth measurement signal that corresponds to a component of the magnetic flux density of the magnetic field in the axial direction or the radial direction of the shaft at the position of the fourth magnetic field sensor.

According to an alternative embodiment of the present invention, the at least one measurement axis of the fourth magnetic field sensor includes two or three measurement axes oriented orthogonally to each other, the at least one measurement signal of the fourth magnetic field sensor including two or three measurement signals from which a component of the magnetic flux density of the magnetic field in the axial direction or the radial direction of the shaft at the position of the fourth magnetic field sensor can be determined. The component of the magnetic flux density of the magnetic field in the axial direction or the radial direction of the shaft at the position of the fourth magnetic field sensor can preferably be determined by the evaluation unit.

Preferably, the evaluation unit is set up to calculate the torque exerted on the shaft using the equation:

$$M = \left[ (B_{SE2} - B_{SE3}) - k \times \frac{d_{23}}{d_{12}} \times (B_{SE1} - B_{SE2}) - (1-k) \times \frac{d_{23}}{d_{34}} \ldots \times (B_{SE3} - B_{SE4}) \right] \times s_{14} \quad (6)$$

with $0 \leq k \leq 1$.

Here:
M is the torque to be determined in "Nm,"
$B_{SE1}$ is the component of the magnetic flux density of the magnetic field in the axial direction or in the radial direction at the position of the first magnetic field sensor in "µT,"
$B_{SE2}$ is the component of the magnetic flux density of the magnetic field in the axial direction or in the radial direction at the position of the second magnetic field sensor in "µT,"
$B_{SE3}$ is the component of the magnetic flux density of the magnetic field in the axial direction or in the radial direction at the position of the third magnetic field sensor in "µT,"

$B_{SE4}$ is the fourth measurement signal in "µT", $d_{12}$ is the distance between the first magnetic field sensor and the second magnetic field sensor in "mm,"

$d_{23}$ is the distance between the second magnetic field sensor and the third magnetic field sensor in "mm,"

$d_{34}$ is the distance between the third magnetic field sensor and the fourth magnetic field sensor in "mm,"

$s_{14}$ is the sensitivity of the magnetoelastic torque sensor in "Nm/µT," and k a weighting factor by which the compensation characteristics can be optimized for an application-specific nonlinear interference field portion (complete elimination) or, in general, the worst-case error due to nonlinear interference field portions can be minimized.

Through the equation (6) and the difference formation contained therein, interference field portions due to homogeneous interference fields and superimposed linear interference field gradients can be eliminated in the calculation of the torque, independently of the selected value for the weighting factor k, as long as 0≤k≤1. The errors due to nonlinear interference field gradients can be eliminated or minimized as a function of the selected k. In this way, the measurement signals of the first magnetic field sensor, the second magnetic field sensor, the third magnetic field sensor and the fourth magnetic field sensor can be used to determine the torque even more accurately, even in the case of a non-linear interference field gradient in the vicinity of the magnetoelastic torque sensor.

Advantageously, the sensitivity of the magnetoelastic torque sensor is ascertained by two-point calibration free of interference fields and after offset correction. In particular, the sensitivity is ascertained according to the following equation:

$$s_{14} = (M_2 - M_1)/ \tag{7}$$
$$\left( \left[ (B_{SE2}(M_2) - B_{SE3}(M_2)) - k\frac{d_{23}}{d_{12}} \times (B_{SE1}(M_2) - B_{SE2}(M_2)) \ldots - \right.\right.$$
$$\left. (1-k)\frac{d_{23}}{d_{34}} \times (B_{SE3}(M_2) - B_{SE4}(M_2)) \right] -$$
$$\ldots \left[ (B_{SE2}(M_1) - B_{SE3}(M_1)) - k\frac{d_{23}}{d_{12}} \times (B_{SE1}(M_1) - B_{SE2}(M_1)) \ldots - \right.$$
$$\left.\left. (1-k)\frac{d_{23}}{d_{34}} \times (B_{SE3}(M_1) - B_{SE4}(M_1)) \right] \right)$$

Here:

$M_1$ is the torque in "Nm" at the first point of the two-point calibration, $M_2$ is the torque "Nm" at the second point of the two-point calibration, $B_{SEa}(Mb)$ is the measured measurement signal of the magnetic sensor "a" in "µT" at the point "b" of the two-point calibration where a=1 for the first magnetic field sensor, a=2 for the second magnetic field sensor, a=3 for the third magnetic field sensor, and a=4 for the fourth magnetic field sensor, and b=1 for the first point and b=2 for the second point of the two-point calibration, $d_{12}$ is the distance between the first magnetic field sensor and the second magnetic field sensor in "mm,"

$d_{23}$ is the distance between the second magnetic field sensor and the third magnetic field sensor in "mm,"

$d_{34}$ is the distance between the third magnetic field sensor and the fourth magnetic field sensor in "mm," and k is the weight factor described above with reference to equation (6).

According to an example embodiment of the present invention, preferably, the first magnetic field sensor, the second magnetic field sensor, the third magnetic field sensor, and the fourth magnetic field sensor are situated relative to each other and relative to the at least one magnetized region such that the following condition is satisfied:

$$\left| (N_{SE2} - N_{SE3}) - k \times \frac{d_{23}}{d_{12}} \times (N_{SE1} - N_{SE2}) - \right. \tag{8}$$
$$\left. (1-k) \times \frac{d_{23}}{d_{34}} \ldots \times (N_{SE3} - N_{SE4}) \right| > 0 \ \mu T$$

with 0≤k≤1.

In particular, the first magnetic field sensor, the second magnetic field sensor, the third magnetic field sensor, and the fourth magnetic field sensor are situated relative to each other and relative to the at least one magnetized region such that the following condition is satisfied:

$$\left| (N_{SE2} - N_{SE3}) - k \times \frac{d_{23}}{d_{12}} \times (N_{SE1} - N_{SE2}) - \right. \tag{9}$$
$$\left. (1-k) \times \frac{d_{23}}{d_{34}} \ldots \times (N_{SE3} - N_{SE4}) \right| > 50 \ \mu T$$

with 0≤k≤1.

Here:

$N_{SE1}$ is a predetermined component of the magnetic flux density in "µT" of a magnetic field produced by the at least one magnetized region at a position of the first magnetic field sensor due to a loading of the shaft with a maximum torque measurable by the magnetoelastic torque sensor, $N_{SE2}$ is a predetermined component of the magnetic flux density in "µT" of a magnetic field produced by the at least one magnetized region at a position of the second magnetic field sensor due to a loading of the shaft with the maximum torque measurable by the magnetoelastic torque sensor, and $N_{SE3}$ is a predetermined component of the magnetic flux density in "µT" of a magnetic field produced by the at least one magnetized region at a position of the third magnetic field sensor due to a loading of the shaft with a maximum torque measurable by the magnetoelastic torque sensor, $N_{SE4}$ is a predetermined component of the magnetic flux density in "µT" of a magnetic field produced by the at least one magnetized region at a position of the fourth magnetic field sensor due to a loading of the shaft with a maximum torque measurable by the magnetoelastic torque sensor, $d_{12}$ is the distance between the first magnetic field sensor and the second magnetic field sensor in "mm,"

$d_{23}$ is the distance between the second magnetic field sensor and the third magnetic field sensor in "mm,"

$d_{34}$ is the distance between the third magnetic field sensor and the fourth magnetic field sensor in "mm," and k is the weight factor described above with reference to equation (6).

In particular, the above predetermined magnetic flux densities are offset-corrected and interference-field-free magnetic flux densities.

Preferably, a sum of the distance between the first magnetic field sensor and the second magnetic field sensor in the axial direction, the distance between the second magnetic field sensor and the third magnetic field sensor in the axial direction, and the distance between the third magnetic field sensor and the fourth magnetic field sensor is greater than or equal to 6 mm and less than 20 mm. In other words, a distance between the first magnetic field sensor and the fourth magnetic field sensor in the axial direction is preferably greater than or equal to 6 mm and less than 20 mm.

In this way, the magnetoelastic torque sensor is realized so as to be compact in the axial direction. In particular, the at least three magnetic field sensors may include exactly the first magnetic field sensor, the second magnetic field sensor, the third magnetic field sensor, and the fourth magnetic field sensor.

According to an advantageous embodiment of the present invention, the shaft has only one magnetized region to which the at least three magnetic field sensors are assigned. In particular, the first magnetic field sensor, the second magnetic field sensor and the third magnetic field sensor or the first magnetic field sensor, the second magnetic field sensor, the third magnetic field sensor and the fourth magnetic field sensor are assigned to the one magnetized region.

According to an alternative advantageous embodiment of the present invention, the shaft has only a first magnetized region and a second magnetized region, the first magnetized region and the second magnetized region having opposite magnetizations. In other words, the shaft is preferably provided with only two magnetized regions that have opposite magnetizations. The first magnetized region and the second magnetized region can have the same magnetization in terms of magnitude. However, it is possible for the magnitudes of the magnetizations of the first magnetized region and the second magnetized region to be different.

Preferably, the first magnetic field sensor and the second magnetic field sensor are assigned to the first magnetized region and the third magnetic field sensor is assigned to the second magnetized region. Alternatively, the first magnetic field sensor and the second magnetic field sensor can preferably be assigned to the first magnetized region and the third magnetic field sensor, and the fourth magnetic field sensor can be assigned to the second magnetized region.

The formulation that a magnetic field sensor is assigned to a magnetized region means in particular that the magnetic field sensor is set up to acquire one or more components of the magnetic flux density of a magnetic field that can be produced by this magnetized region when there is a loading of the shaft with a torque.

The first magnetic field sensor and/or the second magnetic field sensor and/or the third magnetic field sensor and/or the fourth magnetic field sensor can each be designed, for example, as a Hall sensor, AMR sensor (sensor based on the AMR effect; anisotropic magnetoresistive effect), GMR sensor (sensor based on the GMR effect; giant magnetoresistance sensor), fluxgate magnetometer, or TMR sensor (tunnel magnetoresistive sensor).

It is to be noted that in the context of the present invention, a distance between one magnetic field sensor and another magnetic field sensor is advantageously defined as the distance between a point, in particular the sensor center, of one magnetic field sensor and the corresponding point, in particular the sensor center, of the other magnetic field sensor.

In particular, in the context of the present invention, the term "magnetized region" may also be referred to as "magnetized track" or "magnetized path."

The present invention further relates to a vehicle having a magnetoelastic torque sensor as described above.

In particular, the vehicle can be operated electrically and/or with muscular force and can have a crank drive. The magnetoelastic torque sensor is advantageously situated on the crank drive and is in particular set up to acquire a torque applied to the crank drive by a driver by muscular force.

In addition, the present invention relates to a method for determining a torque using a magnetoelastic torque sensor described above. The method includes the steps of acquiring at least one measurement signal of the first magnetic field sensor, acquiring at least one measurement signal of the second magnetic field sensor, acquiring at least one measurement signal of the third magnetic field sensor, and determining a torque exerted on the shaft using the at least one measurement signal of the first magnetic field sensor, the at least one measurement signal of the second magnetic field sensor, the at least one measurement signal of the third magnetic field sensor, and a ratio of a distance between the second magnetic field sensor and the third magnetic field sensor in the axial direction to a distance between the first magnetic field sensor and the second magnetic field sensor in the axial direction. The advantages described with reference to the magnetoelastic torque sensor described above also apply here.

In other words, the present invention relates to a method for determining a torque, including the steps of acquiring at least one measurement signal of a first magnetic field sensor, acquiring at least one measurement signal of a second magnetic field sensor, and acquiring at least one measurement signal of a third magnetic field sensor, the second magnetic field sensor being situated in the axial direction between the first magnetic field sensor and the third magnetic field sensor, and the magnetic field sensors each having at least one measurement axis and being set up to acquire a component of a magnetic flux density of a magnetic field in the direction of the at least one measurement axis. At least one of the magnetic field sensors is situated relative to at least one magnetized region of a shaft in such a way that the magnetic field sensor is set up to acquire a component of a magnetic flux density of a magnetic field in the direction of the respective at least one measurement axis that can be produced when the shaft is subjected to a torque load by the magnetized region. Further, the method includes the step of determining a torque exerted on the shaft using the at least one measurement signal of the first magnetic field sensor, the at least one measurement signal of the second magnetic field sensor, the at least one measurement signal of the third magnetic field sensor, and a ratio of a distance between the second magnetic field sensor and the third magnetic field sensor in the axial direction to a distance between the first magnetic field sensor and the second magnetic field sensor in the axial direction.

It should be noted that the features of the magnetoelastic torque sensor explained above can also be formulated as method features.

Depending on the type of magnetic field sensor, the evaluation unit and the magnetic field sensors can be advantageously connected to each other in terms of information/digitally, or in an analog manner. In other words, an interface between the evaluation unit and the magnetic field sensors can be digital or analog, depending on the type of magnetic field sensor.

BRIEF DESCRIPTION OF THE DRAWINGS

In the following, exemplary embodiments of the present invention are described in detail with reference to the figures, identical or functionally identical components each being provided with the same reference sign.

DETAILED DESCRIPTION OF EXAMPLE EMBODIMENTS

In the following, a magnetoelastic torque sensor 10 according to a first exemplary embodiment of the present invention is described in detail with reference to FIGS. 1 through 5.

Figure 1:
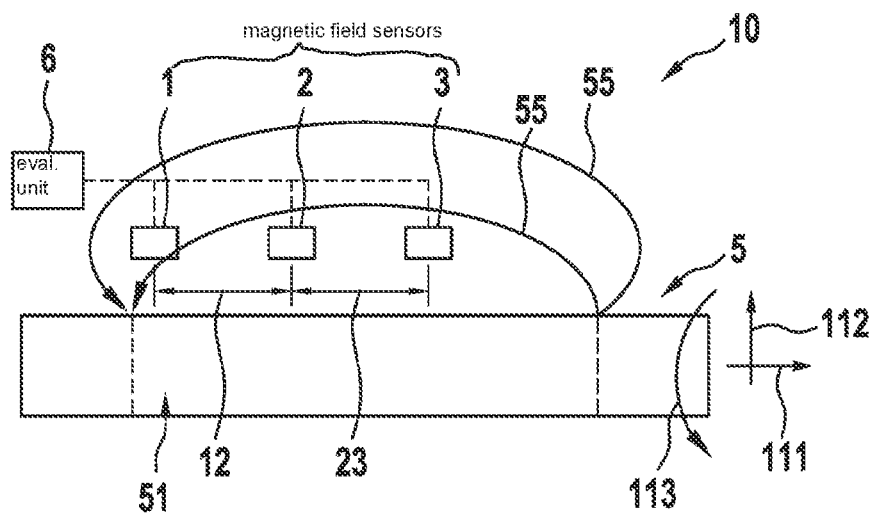
FIG. 1 is a simplified schematic view of a magnetoelastic torque sensor according to a first exemplary embodiment of the present invention.

As can be seen from FIG. 1, magnetoelastic torque sensor 10 includes a magnetoelastic shaft 5, a first magnetic field sensor 1, a magnetic field sensor 2, a third magnetic field sensor 3, and an evaluation unit 6.

A magnetized region 51 is formed in shaft 5, which is advantageously circular-cylindrical in shape. Magnetized region 51 corresponds to a part of the shaft 5 that has been magnetized. However, it is also possible for magnetized region 51 to be provided by an additional magnetized component surrounding shaft 5, in particular by a magnetized ring.

It is to be noted that in this embodiment, shaft 5 includes only the magnetized region 51, and magnetoelastic torque sensor 10 also does not include any magnetic field sensors other than first magnetic field sensor 1, second magnetic field sensor 2, and third magnetic field sensor 3.

Shaft 5 defines an axial direction 111, a radial direction 112 and a circumferential direction 113. Shaft 5 extends in the axial direction 111. In the context of the present invention, axial direction 111, radial direction 112 and circumferential direction 113 of the shaft 5 may also be referred to as an axial direction, a radial direction and a circumferential direction of magnetoelastic torque sensor 10.

First magnetic field sensor 1, second magnetic field sensor 2, and third magnetic field sensor 3, which each have at least one measurement axis and are set up to acquire a component of the magnetic flux density of a magnetic field in the direction of the at least one measurement axis, can advantageously be situated at the same position in the radial direction 112 and the circumferential direction 113 relative to shaft 5. In the axial direction 111, first magnetic field sensor 1, second magnetic field sensor 2, and third magnetic field sensor 3 are situated at different positions relative to shaft 5.

As can further be seen from FIG. 1, second magnetic field sensor 2 is positioned between first magnetic field sensor 1 and third magnetic field sensor 3.

In particular, first magnetic field sensor 1 and second magnetic field sensor 2 are situated at a distance 12 from each other in axial direction 111. In addition, third magnetic field sensor 3 is situated at a distance 23 from second magnetic field sensor 2 in axial direction 111.

Here, a sum of distance 12 between first magnetic field sensor 1 and second magnetic field sensor 2 in axial direction 111 and distance 23 between second magnetic field sensor 2 and third magnetic field sensor 3 in axial direction 111 is greater than or equal to 4 mm and less than 20 mm. First magnetic field sensor 1, second magnetic field sensor 2, and third magnetic field sensor 3 are situated relative to each other and to magnetized region 51 of shaft 5 such that one of the following two conditions is satisfied:

$$\left| (N_{SE2} - N_{SE3}) - \frac{d_{23}}{d_{12}} \times (N_{SE1} - N_{SE2}) \right| > 50 \ \mu T \text{ with } \frac{d_{23}}{d_{12}} \leq 1$$

$$\left| (N_{SE1} - N_{SE2}) - \frac{d_{12}}{d_{23}} \times (N_{SE2} - N_{SE3}) \right| > 50 \ \mu T \text{ with } \frac{d_{12}}{d_{23}} < 1.$$

Here:

$N_{SE1}$ is a predetermined component of the magnetic flux density in "µT" of a magnetic field produced by magnetized region 51 at a position of first magnetic field sensor 1 due to a loading of shaft 5 with a maximum torque measurable by magnetoelastic torque sensor 10, $N_{SE2}$ is a predetermined component of the magnetic flux density in "µT" of a magnetic field produced by magnetized region 51 at a position of second magnetic field sensor 2 due to a loading of shaft 5 with the maximum torque measurable by magnetoelastic torque sensor 10, and $N_{SE3}$ is a predetermined component of the magnetic flux density in "T" of a magnetic field produced by magnetized region 51 at a position of third magnetic field sensor 3 due to a loading of shaft 5 with a maximum torque measurable by magnetoelastic torque sensor 10.

Advantageously, the above predetermined magnetic flux densities are offset-corrected and interference-field-free magnetic flux densities.

In particular, the three magnetic field sensors 1, 2, 3 are assigned to magnetized region 51. In other words, the three magnetic field sensors 1, 2, 3 are situated relative to magnetized region 51 such that magnetic field sensors 1, 2, 3 are each set up to acquire a component of the magnetic flux density of a magnetic field, which can be produced by magnetized region 51 when a torque is applied to shaft 5, in axial direction 111.

The way in which a magnetic field results when shaft 5 is subjected to a torque load is explained below with reference to FIGS. 2 and 3.

Figure 2:
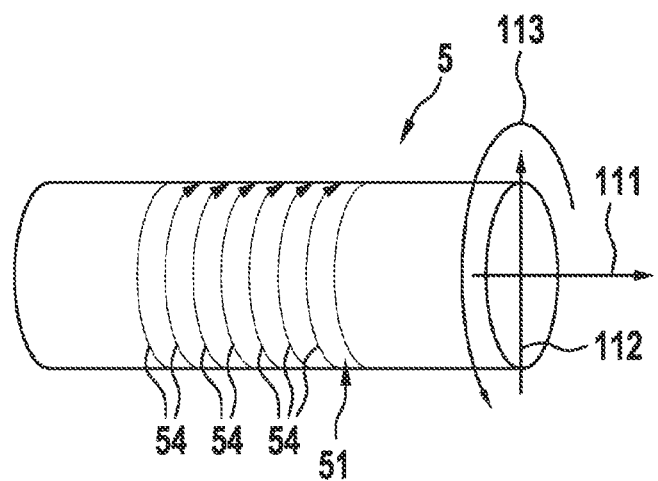
FIG. 2 is a simplified schematic view of a shaft of the magnetoelastic torque sensor of FIG. 1 without torque load on the shaft.

FIG. 2 shows shaft 5 of magnetoelastic torque sensor 10 without a torque load. As can be seen from this Figure, magnetized region 51 of shaft 5 has closed field lines 54 that run in circumferential direction 113 in shaft 51.

Figure 3:
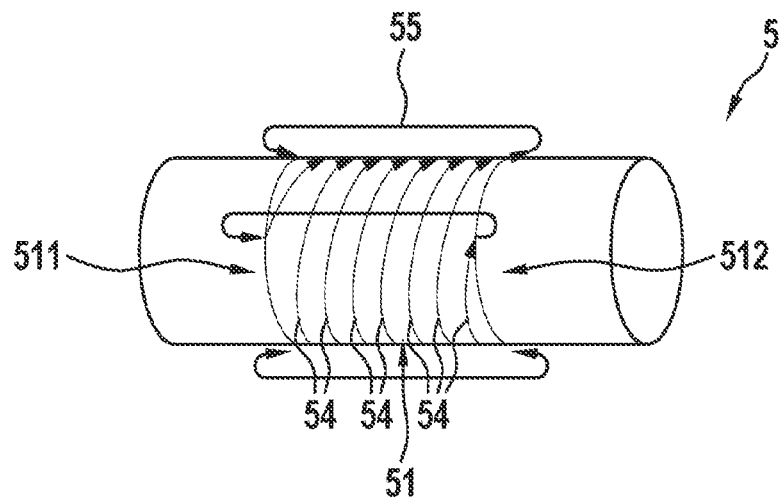
FIG. 3 is a simplified schematic view of the shaft of the magnetoelastic torque sensor of FIG. 2 with a torque load on the shaft.

On the other hand, FIG. 3 shows shaft 5 in a state in which it is loaded with a torque. The torque exerted on shaft 5, or magnetized region 51, causes mechanical stress in shaft 5. Due to the magnetoelastic interaction occurring in magnetized region 51 of shaft 5, the field lines 54 are rotated in the direction of the stress. As a result, field lines 54 run helically around shaft 5. The result is that the field lines 54 arriving at one end 512 of magnetized region 51 leave shaft 5 and return to a beginning 511 of magnetized region 51. As a result, a magnetic field arises in the area outside shaft 5 that is always oriented along shaft 5. This magnetic field is called the useful field. Exactly in the center of magnetized region 51, the useful field is parallel to shaft 5, whereas in the edge areas of magnetized region 51, the portion of the useful field perpendicular out of shaft 5 becomes increasingly larger. The useful field, which is shown in FIGS. 1 and 3 by field lines 55, or the magnetic flux density of the useful field outside shaft 5, is proportional to the torque exerted on shaft 5 at each point.

The magnetic flux density of the useful field outside shaft 5 can be acquired by magnetic field sensors 1, 2, 3, each of which is set up to output a measurement signal. If a magnetic interference field is present in the vicinity of the shaft 5 or the torque-elastic magnetic sensor 10, when the shaft 5 is subjected to a torque load the measurement signal of each magnetic field sensor 1, 2, 3 includes not only the corresponding magnetic flux density of the produced useful field, but also the magnetic flux density of the superimposed magnetic interference field at the position of the respective magnetic field sensor 1, 2, 3.

In particular, evaluation unit 6 is set up to acquire a first measurement signal of first magnetic field sensor 1, a second measurement signal of second magnetic field sensor 2 and a third measurement signal of third magnetic field sensor 3. For this purpose, evaluation unit 6 is connected to the three magnetic field sensors 1, 2 and 3, in particular so as to receive information.

In particular, the first measurement signal, the second measurement signal, and the third measurement signal are offset-corrected measurement signals. Offset correction is advantageously performed in a torque-free and interference-field-free state.

To determine the torque applied to shaft 5, evaluation unit 6 is set up to use the first measurement signal, the second measurement signal, the third measurement signal, a ratio of the distance 23 between second magnetic field sensor 23 and third magnetic field sensor 3 in axial direction 111 to the distance 12 between first magnetic field sensor 1 and second magnetic field sensor 2 in axial direction 111, and a sensitivity of magnetoelastic torque sensor 10.

Here, the first measurement signal corresponds to the component of the magnetic flux density of the magnetic field in the axial direction at the position of the first magnetic field sensor, the second measurement signal corresponds to the component of the magnetic flux density of the magnetic field in the axial direction at the position of the second magnetic field sensor, and the third measurement signal corresponds to the component of the magnetic flux density of the magnetic field in the axial direction at the position of the third magnetic field sensor.

In particular, evaluation unit 6 is set up to determine a torque exerted on shaft 5 using the equation $$M = \left[ (B_{SE2} - B_{SE3}) - \frac{d_{23}}{d_{12}} \times (B_{SE1} - B_{SE2}) \right] \times s_{13}$$

Here:

M is the torque to be determined in "Nm,"

$B_{SE1}$ is the component of the magnetic flux density of the magnetic field in the axial direction at the position of the first magnetic field sensor in "µT,"

$B_{SE2}$ is the component of the magnetic flux density of the magnetic field in the axial direction at the position of the second magnetic field sensor in "µT,"

$B_{SE3}$ is the component of the magnetic flux density of the magnetic field in the axial direction at the position of the third magnetic field sensor in "UT,"

$d_{12}$ is the distance 12 between first magnetic field sensor 1 and second magnetic field sensor 2 in "mm,"

$d_{23}$ is the distance 23 between second magnetic field sensor 2 and third magnetic field sensor 3 in "mm,"

and $s_{13}$ is the sensitivity of magnetoelastic torque sensor 10 in "Nm/µT."

The proposed configuration of magnetic field sensors 1, 2, 3 and the proposed calculation of a torque exerted on shaft 5 of magnetoelastic torque sensor 10 can eliminate homogeneous interference fields and linear interference field gradients in the axial direction 111 directly and without approximation during the calculation. In addition, these directly eliminated interference fields can also be calculated without approximation and can be available for possible monitoring functions. The calculation of the eliminated interference fields is explained in more detail below with reference to FIG. 4.

A small, usually negligible, error in the calculation of the torque can still result e.g. from nonlinear gradients, since for the calculation equation given above the assumption is made that the nonlinear interference field portions are zero. However, the nonlinear portions are negligible in magnitude compared to the homogeneous interference fields and linear interference field gradients that usually exist in the environment of magnetoelastic torque sensor 10.

In order to further reduce this small error, in the case of a nonlinear interference field portion present in the vicinity of shaft 5 of magnetoelastic torque sensor 10, when calculating a torque exerted on shaft 5 using the measurement signals of only three magnetic field sensors, namely magnetic field sensors 1, 2, 3, evaluation unit 6 can further be set up to calculate the torque exerted on shaft 5 using the equation $$M = \left[ (B_{SE2} - B_{SE3}) - k \times \frac{d_{23}}{d_{12}} \times (B_{SE1} - B_{SE2}) \right] \times s_{13}$$

with $0.9 \leq k < 1$ or $1 < k \leq 1.1$.

The difference between the two equations is the use of a predetermined weight factor k in the second equation. By introducing this weighting factor into the torque calculation, in the case of an existing nonlinear interference field portion in axial direction 111 in the vicinity of shaft 5 or of magnetoelastic torque sensor 10, an error in the determination of the torque caused by the nonlinear interference field portion can be reduced.

In other words, in the case of a nonlinear interference field gradient that is always realized in the same way in the region of magnetoelastic torque sensor 10 in a target application, the predetermined weight factor k can further reduce the small error that would arise using the first equation, whereas in applications that vary in location and environment, in which the assumption of a nonlinear interference field gradient that is always realized in the same way is incorrect because variable realizations of the interference field gradient can occur, the error caused in the torque calculation can turn out to be larger compared to the first equation, so that in such an application the first equation without the predetermined weighting factor k is the preferred choice in order to minimize the largest possible error.

The sensitivity of magnetoelastic torque sensor 10 can be determined by two-point calibration free of interference fields and after offset correction. In particular, the sensitivity is determined according to equation 3a or equation 3b from the general part of the description.

First magnetic field sensor 1 and/or second magnetic field sensor 2 and/or the third magnetic field sensor 3 can each be designed, for example, as a Hall sensor, AMR sensor (sensor based on the AMR effect; anisotropic magnetoresistive effect), GMR sensor (sensor based on the GMR effect; giant magnetoresistance sensor), fluxgate magnetometer, or TMR sensor (tunnel magnetoresistive sensor).

Figure 4:
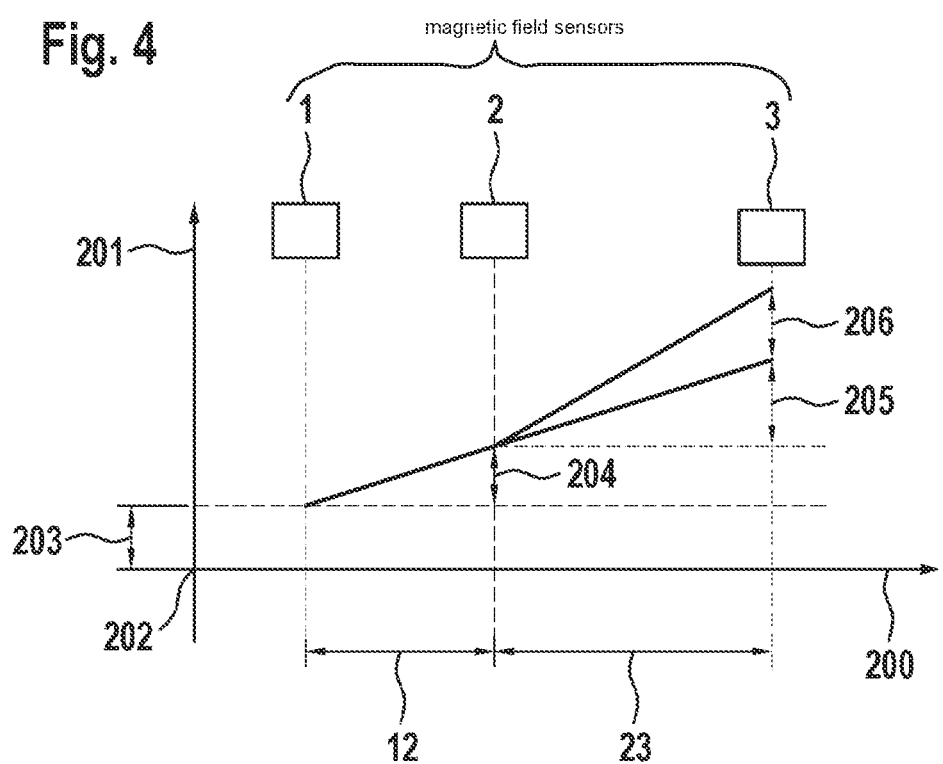
FIG. 4 is a diagram showing an example of a magnetic interference field in the environment of the magnetoelastic torque sensor.

FIG. 4 shows a diagram illustrating an example of a magnetic interference field in the vicinity of magnetoelastic torque sensor 10.

The x axis 200 designates the distance along shaft 5 in axial direction 111 in "mm" measured from an origin 202, and the y axis 201 designates the component of the magnetic flux density of the interference field in the axial direction (111) in "µT." The zero value of the origin 202 in the x axis 200 corresponds to a beginning of shaft 5.

FIG. 4 shows that between first magnetic field sensor 1 and third magnetic field sensor 3 the magnetic interference field has a homogeneous portion 203 that is defined with respect to magnetic field sensor 1. That is, this homogeneous portion 203 is present at the positions of first magnetic field sensor 1, second magnetic field sensor 2, and third magnetic field sensor 3 in axial direction 111.

Through the definition of the reference of the homogeneous portion 203 to first magnetic field sensor 1, only the homogeneous portion 203 is present at the position of first magnetic field sensor 1. In addition, between first magnetic field sensor 1 and third magnetic field sensor 3 there is a linear interference field gradient, so that at the position of second magnetic field sensor 2 in axial direction 111 there is the homogeneous portion 203 and a linear portion 204, and at the position of third magnetic field sensor 3 in axial direction 111 there is the homogeneous portion 203, the linear portion 204, and a further linear portion 205.

As can also be seen from FIG. 4, there is a further portion 206 of an interference field gradient between second magnetic field sensor 2 and third magnetic field sensor 3, so that there is a non-linear interference field gradient between first magnetic field sensor 1 and third magnetic field sensor 3, summed up. Through the definition of the measurable gradient between first magnetic field sensor 1 and second magnetic field sensor 2 as purely linear, in order to map a nonlinear interference gradient between first magnetic field sensor 1 and third magnetic field sensor 3, portion 206 must be added to linear portion 205 between second magnetic field sensor 2 and third magnetic field sensor 3 at the position of third magnetic field sensor 3. Thus, a non-linear portion 206 is also present at the position of third magnetic field sensor 3 in axial direction 111.

It is to be noted that the equations described above for calculating a torque applied to shaft 5 of magnetoelastic torque sensor 10 enable an elimination or compensation of an interference field in the vicinity of shaft 5 or magnetoelastic torque sensor 10 independently of the exact course of the interference field in axial direction 111.

The various portions of the interference field shown in FIG. 4 can be ascertained using the following equations:

$$\Delta S_{lin}(d_{23}) = \frac{X}{Y}$$

where:

$$X = \frac{d_{23}}{d_{12}} \times (N_{SE1}(M_2) - N_{SE2}(M_2)) \times (N_{SE2} - N_{SE3} + \Delta S_{n.l.}) -$$

$$\frac{d_{23}}{d_{12}} \ldots \times (N_{SE2}(M_2) - N_{SE3}(M_2)) \times (N_{SE1} - N_{SE2})$$

and $$Y = N_{SE2}(M_2) - N_{SE3}(M_2) - \frac{d_{23}}{d_{12}} (N_{SE1}(M_2) - N_{SE2}(M_2)) \Delta S_{x,lin}(d_{12}) =$$

$$\Delta S_{x,lin}(d_{23}) \times \frac{d_{12}}{d_{23}} \Delta S_{lin}(d_{13}) = \Delta S_{lin}(d_{23}) \times \frac{d_{12} + d_{23}}{d_{23}}$$

Here:

$\Delta S_{lin}(d_{23})$ is the linear portion 205 in "µT,"

$\Delta S_{lin}(d_{12})$ is the linear portion 204 in "µT,"

$\Delta S_{lin}(d_{13})$ is the overall linear portion of the magnetic interference field at the position of third magnetic field sensor 3, which corresponds to the sum of the linear portion 205 and the linear portion 204, and $\Delta S_{n,l}$ is the non-linear portion 206.

The useful fields $N_{SEa}(M_2)$ in "µT" (with a=1 for first magnetic field sensor 1, a=2 for second magnetic field sensor 2 and a=3 for third magnetic field sensor 3) are to be determined during calibration (free of interfering fields and after offset correction), where a torque $M_2 >> 0$ Nm must be applied.

In the equations given above for determining the interference field portions, the assumption is to be made that there is no nonlinear interference field gradient, or that the nonlinear interference field gradient is negligible, i.e $\Delta S_{x,n,l} = 0$. At runtime, the linear interference field gradient can be monitored in order to be able to declare the calculated torque as not valid if a defined limit value is exceeded. This is particularly advantageous because as the measured linear interference field gradient increases, the maximum possible error in the calculated torque due to nonlinear interference gradients also increases.

The homogeneous portion 203 of the interference field from FIG. 4 can be ascertained using the following equations:

$$s_{x,hom} = \frac{N_{SE3}(M_2) \times (N_{SE2} - \Delta S_{lin}(d_{12})) - N_{SE2}(M_2) \times (N_{SE3} - \Delta S_{lin}(d_{12}) - \Delta S_{lin}(d_{23}) - \Delta S_{n.l.})}{N_{SE3}(M_2) - N_{SE2}(M_2)}$$

for $N_{SE2} \neq N_{SE3}$ $$S_{hom} = \frac{N_{SE2}(M_2)B_{SE1} - N_{SE1}(M_2)(B_{SE2} - \Delta S_{lin}(d_{12}))}{N_{SE2}(M_2) - N_{SE1}(M_2)} \text{ for } N_{x,SE1} \neq N_{x,SE2}$$

Through corresponding summation of the individual calculated interference field portions from FIG. 4, in each case at the positions of magnetic field sensors 1, 2 and 3, the total interference field component under consideration can thus be determined at the positions of the magnetic field sensors. The portions of the interference field described above, as well as the respective total interference field components, can be calculated by evaluation unit 6.

Figure 5:
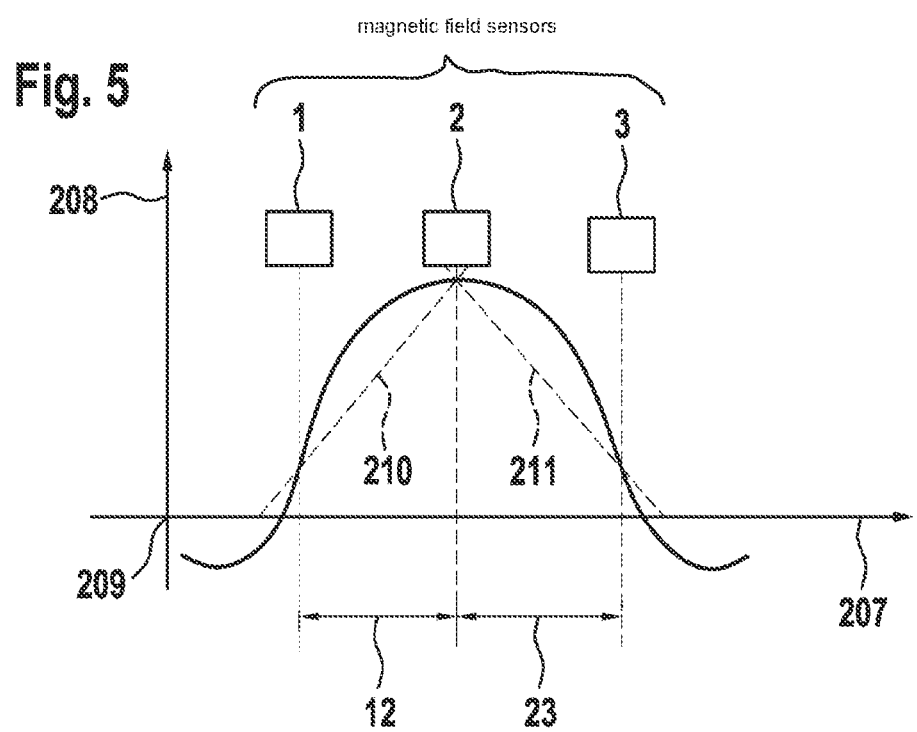
FIG. 5 is a diagram of a distribution of an axial component of a magnetic field along the shaft of an exemplary magnetoelastic torque sensor according to the first exemplary embodiment, which can be produced when there is a torque load on the shaft and can be acquired by the magnetic field sensors of the torque sensor.

FIG. 5 shows a diagram of the magnetic flux density in the axial direction 111 of a magnetic field that can be produced when there is a torque load on shaft 5 of an exemplary magnetoelastic torque sensor 10 according to the first exemplary embodiment and can be acquired by the three magnetic field sensors 1, 2, 3 of torque sensor 10.

The x axis 207 designates the distance along shaft 5 in axial direction 111 in "mm" measured from an origin 209, where the y axis 208 designates the component of the magnetic flux density in the axial direction 111 in "µT." The zero value of the origin 209 in the x axis 207 corresponds to a beginning of shaft 5.

For this exemplary magnetoelastic torque sensor 10, the following holds:

$$\left| (N_{SE2} - N_{SE3}) - \frac{d_{23}}{d_{12}}(N_{SE1} - N_{SE2}) \right| > 50 \text{ µT with } \frac{d_{23}}{d_{12}} \leq 1$$

Illustrated, this means that a first slope 210 and a second slope 211 are different from each other. First slope 210 is the slope of the straight line connecting the point defined by the magnetic flux density of the useful field at the location of first magnetic field sensor 1 to the point defined by the magnetic flux density of the useful field at the location of second magnetic field sensor 2. Accordingly, second slope 211 is the slope of the straight line connecting the point defined by the magnetic flux density of the useful field at the location of second magnetic field sensor 2 to the point defined by the magnetic flux density of the useful field at the location of third magnetic field sensor 3.

In particular, here first slope 210 is positive and second slope 211 is negative.

Figure 6:
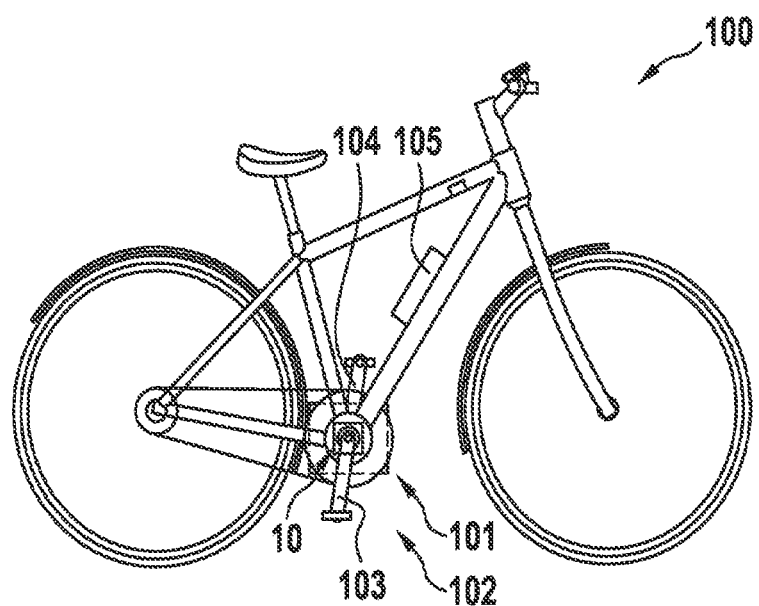
FIG. 6 shows an electric bicycle with a magnetoelastic torque sensor according to the first exemplary embodiment.
Figure 7:
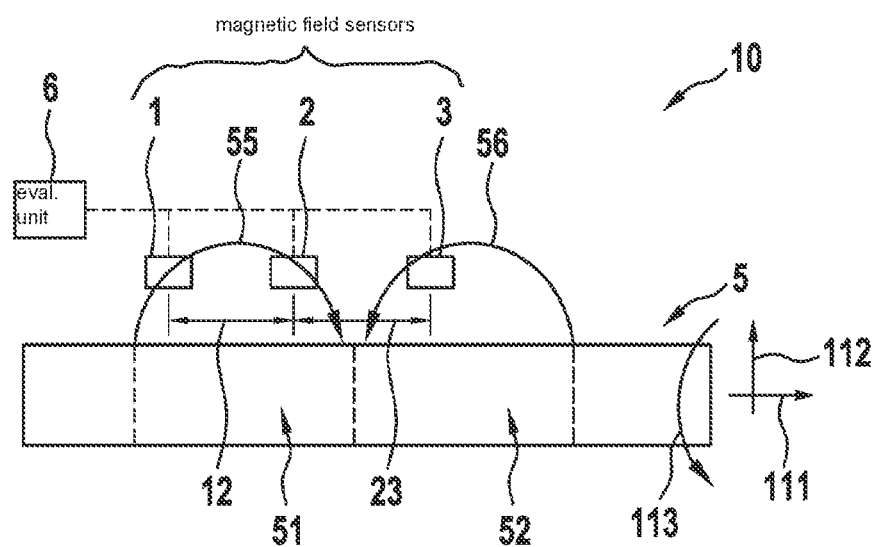
FIG. 7 is a simplified schematic view of a magnetoelastic torque sensor according to a second exemplary embodiment of the present invention.

FIG. 6 shows a vehicle 100 according to the present invention having a magnetoelastic torque sensor 10 according to the first exemplary embodiment.

Vehicle 100 is a vehicle operable by muscular force and/or motor power, in particular an electric bicycle that is provided with an electric drive 101 to support a pedaling force of a driver. Electric drive 101 is situated on a crank drive 102 having a first crank 103 and a second crank 104, and is supplied with electric power by a rechargeable battery 105.

Magnetoelastic torque sensor 10 can be designed or produced as a unit and, as such, can be attached to crank drive 102. Magnetic field sensors 1, 2 and 3, shaft 5, and evaluation unit 6 are advantageously accommodated in a single housing. Alternatively, magnetic field sensors 1, 2, and 3, shaft 5, and evaluation unit 6 may be individually fastened to vehicle 100 in such a way that they work together as magnetoelastic torque sensor 10 according to the present invention.

The use of magnetoelastic torque sensor 10 in a vehicle, such as for example vehicle 100 described above, is only one possible application of the present invention.

FIGS. 7 to 11 relate to a magnetoelastic torque sensor 10 according to a second exemplary embodiment of the present invention.

Magnetoelastic torque sensor 10 according to the second exemplary embodiment differs from that according to the first exemplary embodiment fundamentally in that a first magnetized region 51 and a second magnetized region 52 are formed in shaft 5 of magnetoelastic torque sensor 10 according to the second exemplary embodiment.

Figure 8:
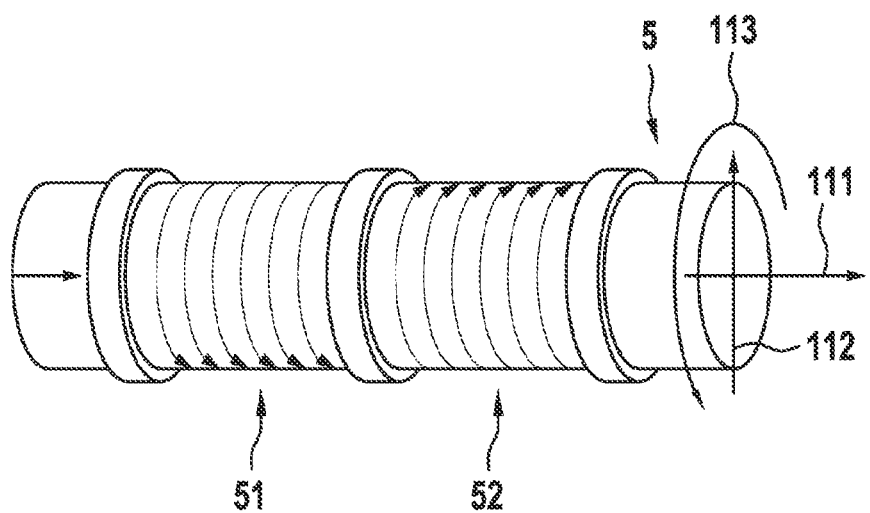
FIG. 8 is a simplified schematic view of a shaft of the magnetoelastic torque sensor of FIG. 7 without torque load on the shaft.

In addition, it can be seen from FIG. 8 that first magnetized region 51 and second magnetized region 52 have opposite magnetizations. In terms of magnitude, the magnetizations of first magnetized region 51 and second magnetized region 52 can be selected to be the same. However, it is also possible for the magnitudes of the magnetizations of magnetized regions 51, 52 to be different.

Referring again to FIG. 7, first magnetic field sensor 1 and second magnetic field sensor 2 are assigned to first magnetized region 51, third magnetic field sensor 3 being assigned to second magnetized region 52. That is, first magnetic field sensor 1 and second magnetic field sensor 2 are each set up to acquire a magnetic flux density of a magnetic field (represented by magnetic flux line 55) produced by first magnetized region 51 when shaft 5 is subjected to a torque load, third magnetic field sensor 3 being set up to acquire a magnetic flux density of a magnetic field (represented by magnetic flux line 56) produced by second magnetized region 52 when shaft 5 is subjected to a torque load.

Figure 9:
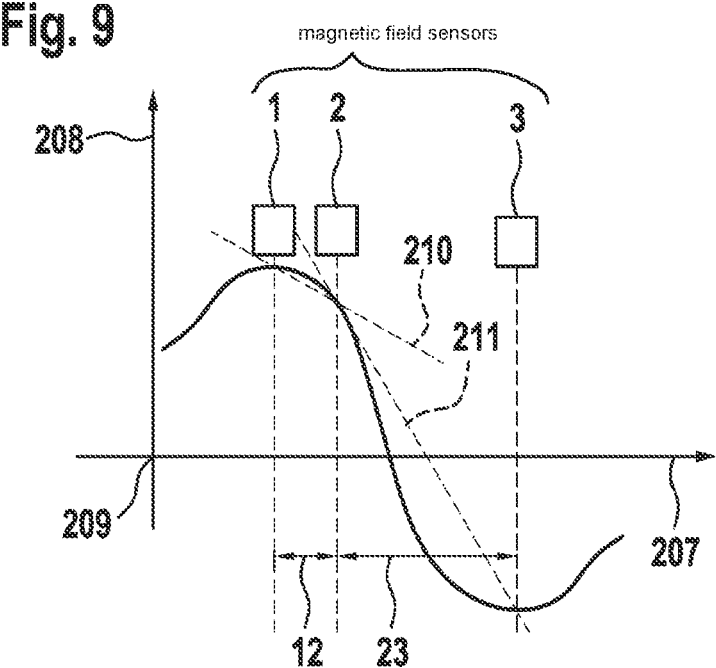
FIG. 9 is a diagram of a distribution of an axial component of a magnetic field along the shaft of a first exemplary magnetoelastic torque sensor according to the second exemplary embodiment, which can be produced when there is a torque load on the shaft and can be acquired by the magnetic field sensors of the torque sensor.
Figure 10:
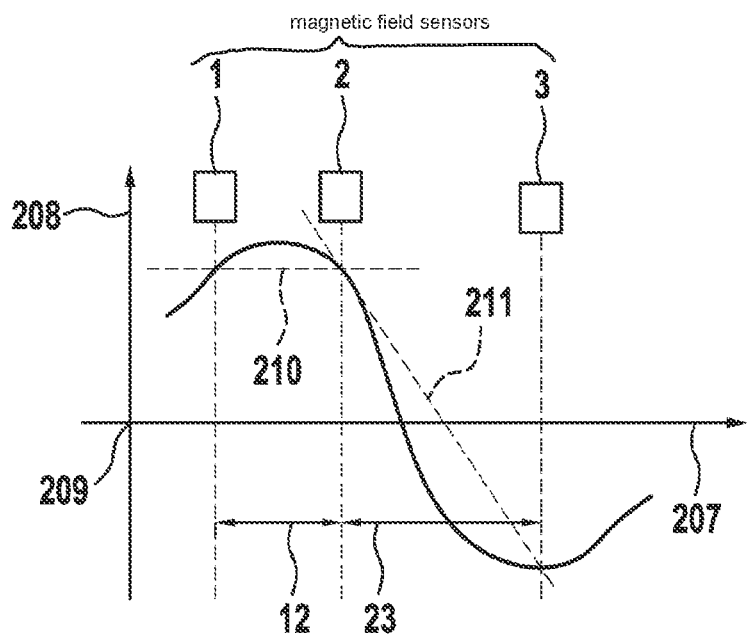
FIG. 10 is a diagram of a distribution of an axial component of a magnetic field along the shaft of a second exemplary magnetoelastic torque sensor according to the second exemplary embodiment, which can be produced when the shaft is subjected to a torque load and can be acquired by the magnetic field sensors of the torque sensor.
Figure 11:
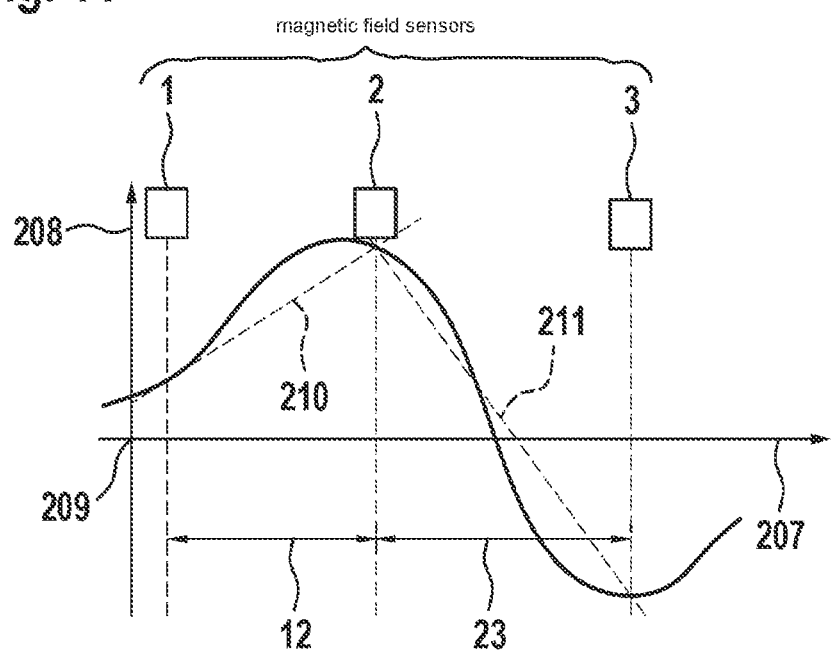
FIG. 11 is a diagram of a distribution of an axial component of a magnetic field along the shaft of a third exemplary magnetoelastic torque sensor according to the second exemplary embodiment, which can be produced when there is a torque load on the shaft and can be acquired by the magnetic field sensors of the torque sensor.

FIG. 9 shows a diagram of the magnetic flux density in the axial direction 111 of a magnetic field that can be produced when there is a torque load on shaft 5 of a first exemplary magnetoelastic torque sensor 10 according to the second exemplary embodiment and can be acquired by the three magnetic field sensors 1, 2, 3 of torque sensor 10. FIG. 10 shows a diagram of the magnetic flux density in the axial direction 111 of a magnetic field that can be produced when there is a torque load on shaft 5 of an exemplary magnetoelastic torque sensor 10 according to the second exemplary embodiment and can be acquired by the three magnetic field sensors 1, 2, 3 of torque sensor 10. FIG. 11 shows a diagram of the magnetic flux density in the axial direction 111 of a magnetic field that can be produced when there is a torque load on shaft 5 of a third exemplary magnetoelastic torque sensor 10 according to the second exemplary embodiment and can be acquired by the three magnetic field sensors 1, 2, 3 of torque sensor 10.

In each diagram, the x axis 207 designates the distance along shaft 5 in axial direction 111 in "mm" measured from an origin 209, where the y axis 208 designates the component of the magnetic flux density in the axial direction 111 in "µT." The zero value of the origin 209 in the x axis 207 corresponds to a beginning of shaft 5.

For the first exemplary magnetoelastic torque sensor 10 of FIG. 9, the following holds:

$$\left|(N_{SE1} - N_{SE2}) - \frac{d_{12}}{d_{23}}(N_{SE2} - N_{SE3})\right| > 50 \ \mu T \text{ with } \frac{d_{12}}{d_{23}} < 1$$

Magnetic field sensors 1, 2, 3 are situated relative to each other, to first magnetized region 51, and to second magnetized region 52 in such a way that the two slopes 210, 211 are negative and of different magnitude.

For the second exemplary magnetoelastic torque sensor 10 of FIG. 10, the following holds:

$$\left|(N_{SE1} - N_{SE2}) - \frac{d_{12}}{d_{23}}(N_{SE2} - N_{SE3})\right| > 50 \ \mu T \text{ with } \frac{d_{12}}{d_{23}} < 1$$

Here, magnetic field sensors 1, 2, 3 are situated relative to each other, to first magnetized region 51, and to second magnetized region 52 in such a way that slopes 210, 211 have different magnitudes, first slope 210 being zero and the second slope being negative.

From the comparison between the exemplary magnetoelastic torque sensors 10 of FIGS. 9 and 10, it can be seen that distance 12 between first magnetic field sensor 1 and second magnetic field sensor 2 in magnetoelastic torque sensor 10 according to FIG. 10 is greater than that in magnetoelastic torque sensor 10 according to FIG. 9. On the other hand, both magnetoelastic torque sensors 10 have the same distance between the corresponding second magnetic field sensor 2 and the corresponding third magnetic field sensor 3, so that the ratio of distance 12 to distance 23 in magnetoelastic torque sensor 10 shown in FIG. 10 is larger than that in magnetoelastic torque sensor 10 shown in FIG. 9.

For the exemplary magnetoelastic torque sensor 10 of FIG. 11, the following holds:

$$\left|(N_{SE1} - N_{SE2}) - \frac{d_{12}}{d_{23}}(N_{SE2} - N_{SE3})\right| > 50 \ \mu T \text{ with } \frac{d_{12}}{d_{23}} < 1$$

From the comparison between the exemplary magnetoelastic torque sensors 10 of FIGS. 10 and 11, it can be seen that distance 12 between first magnetic field sensor 1 and second magnetic field sensor 2 in magnetoelastic torque sensor 10 according to FIG. 11 is greater than that in magnetoelastic torque sensor 10 according to FIG. 10. Although distance 23 between second magnetic field sensor 2 and third magnetic field sensor 3 in magnetoelastic torque sensor 10 according to FIG. 11 is also greater than that in magnetoelastic torque sensor 10 according to FIG. 10, the distances 12, 23 are selected such that the ratio of distance 12 to distance 23 in magnetoelastic torque sensor 10 according to FIG. 11 is greater than that in magnetoelastic torque sensor 10 according to FIG. 10.

If the magnetoelastic torque sensors 10 of FIGS. 9 to 11 are now compared with each other, we can see that magnetoelastic torque sensor 10 of FIG. 9 is the most compact in axial direction 111, with magnetoelastic torque sensor 10 of FIG. 11 having the lowest compactness in axial direction 111. On the other hand, the magnetoelastic torque sensor 10 of FIG. 11 has the greatest resulting useful signal after calculating the individual signals with equation (5b) in relation to the applied torque, the magnetoelastic torque sensor 10 of FIG. 9 having the lowest resulting useful signal after calculating the individual signals with equation (5b) in relation to the applied torque.

Generalized, this means that, for example, for a given magnetization and defined external sensor positions, a maximization of the resulting effective useful signal after calculating the individual signals and in relation to the applied torque of the magnetoelastic torque sensor 10 is enabled by the free selection of the distances 12 and 23.

Figure 12:
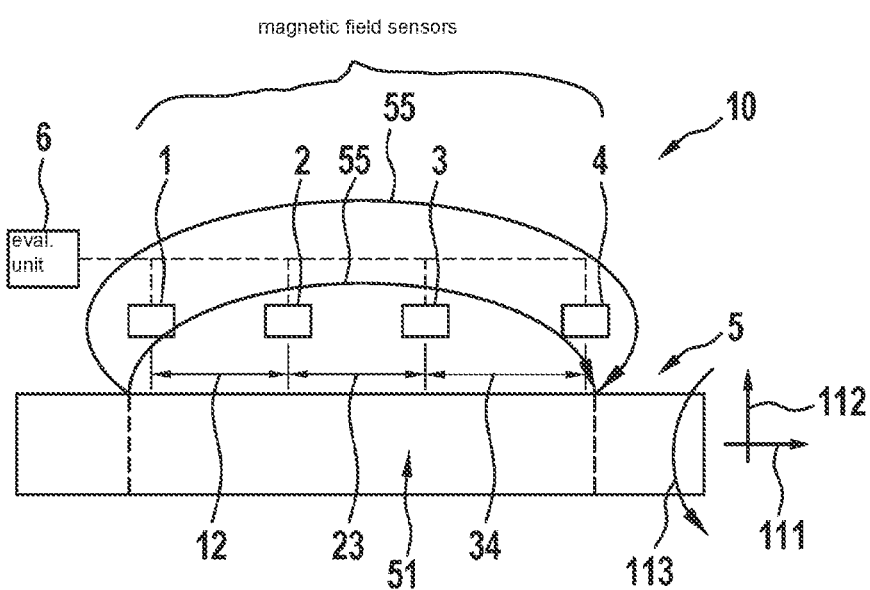
FIG. 12 is a simplified schematic view of a magnetoelastic torque sensor according to a third embodiment of the present invention.

FIG. 12 shows a magnetoelastic torque sensor 10 according to a third exemplary embodiment of the present invention.

The magnetoelastic torque sensor 10 according to the third exemplary embodiment differs from that according to the first exemplary embodiment in that magnetoelastic torque sensor 10 according to the third exemplary embodiment has a fourth magnetic field sensor 4 in addition to first magnetic field sensor 1, second magnetic field sensor 2, and third magnetic field sensor 3.

Here, third magnetic field sensor 3 is situated between second magnetic field sensor 2 and fourth magnetic field sensor 4 in axial direction 111 and has a distance 34 from fourth magnetic field sensor 4 in axial direction 111.

In addition, all four magnetic field sensors 1, 2, 3, 4 are assigned to magnetized region 51. That is, fourth magnetic field sensor 4, like first magnetic field sensor 1, second magnetic field sensor 2, and third magnetic field sensor 3, has at least one measurement axis and is set up to measure a component of the magnetic flux density of a magnetic field in the direction of the at least one measurement axis that is produced by the magnetized region 51 when shaft 5 is subjected to a torque load.

In magnetoelastic torque sensor 10 according to the third exemplary embodiment, a sum of distance 12 between first magnetic field sensor 1 and second magnetic field sensor 2 in axial direction 111, distance 23 between second magnetic field sensor 2 and third magnetic field sensor 3 in axial direction 111, and a distance 34 between third magnetic field sensor 3 and fourth magnetic field sensor 4 in axial direction 111 is greater than or equal to 6 mm and less than 20 mm.

Here evaluation unit 6 is set up to acquire a fourth measurement signal of fourth magnetic field sensor 4. For this purpose, fourth magnetic field sensor 4 is connected to the evaluation unit 6, in particular in terms of information communication.

However, it is also possible for the interface between magnetic field sensors 1, 2, 3, 4 and evaluation unit 6 to be realized in analog fashion.

To determine a torque exerted on shaft 5, evaluation unit 6 is set up to use, besides the first measurement signal, the second measurement signal, the third measurement signal, and the ratio of distance 23 between second magnetic field sensor 2 and third magnetic field sensor 3 in axial direction 111 to distance 12 between first magnetic field sensor 1 and second magnetic field sensor 2 in axial direction 111, in addition the fourth measurement signal and a ratio of a distance 23 between second magnetic field sensor 2 and third magnetic field sensor 3 in axial direction 111 to a distance 34 between third magnetic field sensor 3 and fourth magnetic field sensor 4 in axial direction 111.

In particular, the fourth measurement signal, as well as the first measurement signal, the second measurement signal, and the third measurement signal, is an offset-corrected measurement signal. Offset correction is advantageously performed in a torque-free and interference-field-free state.

Here, the first measurement signal corresponds to the component of the magnetic flux density of the magnetic field in the axial direction at the position of the first magnetic field sensor, the second measurement signal corresponds to the component of the magnetic flux density of the magnetic field in the axial direction at the position of the second magnetic field sensor, the third measurement signal corresponds to the component of the magnetic flux density of the magnetic field in the axial direction at the position of the third magnetic field sensor, and the fourth measurement signal corresponds to the component of the magnetic flux density of the magnetic field in the axial direction at the position of the fourth magnetic field sensor.

Preferably, evaluation unit 6 is set up to determine the torque exerted on shaft 5 using the equation:

$$M = \left[ (B_{SE2} - B_{SE3}) - k \times \frac{d_{23}}{d_{12}} \times (B_{SE1} - B_{SE2}) - (1-k) \times \frac{d_{23}}{d_{34}} \ldots \times (B_{SE3} - B_{SE4}) \right] \times s_{14}$$

with $0 \leq k \leq 1$.

Here:

M is the torque to be determined in "Nm,"

$B_{SE1}$ is the component of the magnetic flux density of the magnetic field in the axial direction at the position of the first magnetic field sensor in "UT,"

$B_{SE2}$ is the component of the magnetic flux density of the magnetic field in the axial direction at the position of the second magnetic field sensor in "UT,"

$B_{SE3}$ is the component of the magnetic flux density of the magnetic field in the axial direction at the position of the third magnetic field sensor in "µT,"

$B_{SE4}$ is the fourth measuring signal in "µT,"

$d_{12}$ is the distance 12 between first magnetic field sensor 1 and second magnetic field sensor 2 in "mm,"

$d_{23}$ is the distance 23 between second magnetic field sensor 2 and third magnetic field sensor 3 in "mm,"

$d_{34}$ is the distance 34 between the third magnetic field sensor 3 and the fourth magnetic field sensor 4 in "mm,"

$s_{14}$ is the sensitivity of the magnetoelastic torque sensor 10 in "Nm/µT," and k is a weighting factor by which the compensation characteristics can be optimized for an application-specific nonlinear interference field portion (complete elimination) or, in general, the worst-case error due to nonlinear interference field portions can be minimized.

Through this calculation equation, during the calculation of the torque interference field portions due to homogeneous interference fields and superimposed linear interference field gradients can be eliminated, independently of the selected value for the weighting factor k, as long as $0 \leq k \leq 1$.

In addition, the weighting factor can be used to mask and eliminate a nonlinear portion of a interference field gradient or to achieve a worst-case error minimization in the case of various nonlinear interference field gradients present in the vicinity of shaft 5 or of magnetoelastic torque sensor 10, as is the case given use in applications that vary in location and environment, where a nonlinear interference field gradient that is always the same cannot be guaranteed.

Advantageously, the sensitivity of magnetoelastic torque sensor 10 is determined by two-point calibration free of interference fields and after offset correction. In particular, the sensitivity is determined according to equation 7 from the general part of the description.

In particular, first magnetic field sensor 1, second magnetic field sensor 2, third magnetic field sensor 3, and fourth magnetic field sensor 4 are situated relative to each other and relative to magnetized region 51 in such a way that the following condition is satisfied:

$$\left| (N_{SE2} - N_{SE3}) - k \times \frac{d_{23}}{d_{12}} \times (N_{SE1} - N_{SE2}) - (1-k) \times \frac{d_{23}}{d_{34}} \ldots \times (N_{SE3} - N_{SE4}) \right| > 50 \ \mu T$$

with $0 \leq k \leq 1$.

Here:

$N_{SE1}$ is a predetermined component of the magnetic flux density in "µT" of a magnetic field produced by magnetized region 51 at a position of first magnetic field sensor 1 due to a loading of shaft 5 with a maximum torque measurable by magnetoelastic torque sensor 10, $N_{SE2}$ is a predetermined component of the magnetic flux density in "T" of a magnetic field produced by magnetized region 51 at a position of second magnetic field sensor 2 due to a loading of shaft 5 with the maximum torque measurable by magnetoelastic torque sensor 10, and $N_{SE3}$ is a predetermined component of the magnetic flux density in "µT" of a magnetic field produced by magnetized region 51 at a position of third magnetic field sensor 3 due to a loading of shaft with a maximum torque measurable by magnetoelastic torque sensor 10, $N_{SE4}$ is a predetermined component of the magnetic flux density in "µT" of a magnetic field produced by magnetized region 51 at a position of first magnetic field sensor 4 due to a loading of shaft 5 with a maximum torque measurable by magnetoelastic torque sensor 10, $d_{12}$ is the distance 12 between the first magnetic field sensor and the second magnetic field sensor 10 in "mm,"

$d_{23}$ is the distance 23 between the second magnetic field sensor and the third magnetic field sensor 10 in "mm,"

$d_{34}$ is the distance 34 between the third magnetic field sensor and the fourth magnetic field sensor 10 in "mm," and k is the weight factor described above.

In particular, the above predetermined magnetic flux densities are offset-corrected and interference-field-free magnetic flux densities.

Figure 13:
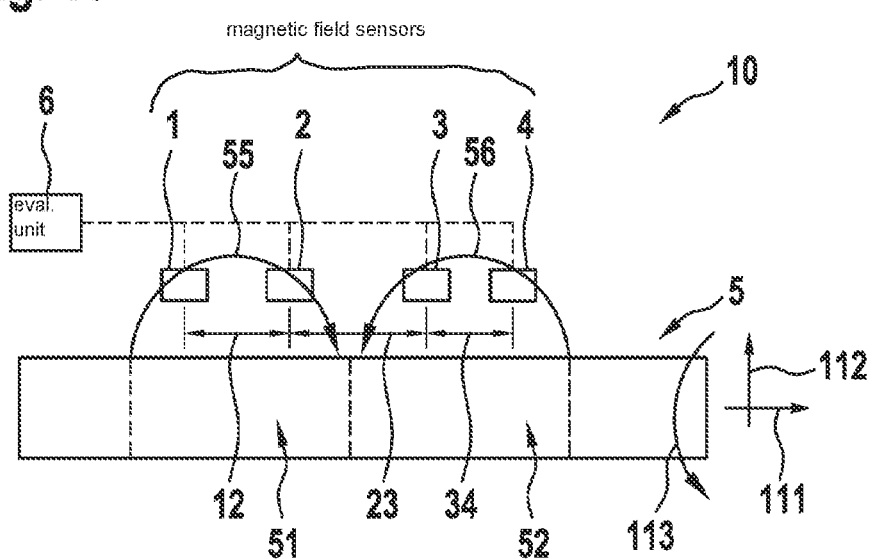
FIG. 13 is a simplified schematic view of a magnetoelastic torque sensor according to a fourth embodiment of the present invention.

FIG. 13 shows a magnetoelastic torque sensor 10 according to a fourth exemplary embodiment of the present invention.

Magnetoelastic torque sensor 10 according to the fourth exemplary embodiment differs from that according to the third exemplary embodiment fundamentally in that magnetoelastic torque sensor 10 according to the fourth exemplary embodiment has a second magnetized region 52 in addition to first magnetized region 51.

Here, first magnetic field sensor 1 and second magnetic field sensor 2 are assigned to first magnetized region 51, with third magnetic field sensor 3 and fourth magnetic field sensor 4 being assigned to second magnetized region 52.

That is, first magnetic field sensor 1 and second magnetic field sensor 2 are each set up to acquire one or more (two or three) components of the magnetic flux density of a magnetic field produced when shaft 5 is subjected to a torque load by first magnetized region 51, third magnetic field sensor 3 and fourth magnetic field sensor 4 each being set up to acquire one or more (two or three) components of the magnetic flux density of a magnetic field produced when shaft 5 is subjected to a torque load by second magnetized region 52.

In particular, first magnetized region 51 and second magnetized region 52 have opposite magnetizations, which can be equal in magnitude. Alternatively, the magnitudes of the magnetizations of magnetized regions 51, 52 may be different.

Although vehicle 100 of FIG. 6 has been described in combination with a magnetoelastic torque sensor 10 according to the first exemplary embodiment, it is to be noted that a magnetoelastic torque sensor 100 according to one of the other exemplary embodiments described can also be used with vehicle 100.

A particular advantage of the present invention is that the described interference field elimination/compensation can be realized even if shaft 5 of magnetoelastic torque sensor 10 has only (at most) one magnetized region 51 or only (at most) two magnetized regions 52, i.e. fewer than three magnetized regions.

It is to be noted that with the present invention, however, the interference field elimination/compensation described can also be realized with a shaft 5 having more than two magnetized regions.

In addition to the above written description of the present invention, for the supplementary disclosure thereof explicit reference is hereby made to the graphic representation of the present invention in FIGS. 1 to 13.

What is claimed is:

1. A magnetoelastic torque sensor, comprising:
a shaft having a first magnetized region and a second magnetized region, the first magnetized region and the second magnetized region having opposite magnetizations, and the shaft having an axial direction and a radial direction;
at least three magnetic field sensors, each having at least one measurement axis and being configured to acquire a component of a magnetic flux density of a magnetic field in a direction of the at least one measurement axis; and
an evaluation unit;
wherein the at least three magnetic field sensors include a first magnetic field sensor, a second magnetic field sensor, and a third magnetic field sensor, the second magnetic field sensor being situated in the axial direction between the first magnetic field sensor and the third magnetic field sensor;
wherein the first magnetic field sensor and the second magnetic field sensor are assigned to the first magnetized region and the third magnetic field sensor is assigned to the second magnetized region;
wherein at least one of the at least three magnetic field sensors is situated relative to the at least one magnetized region in such a way that the at least one magnetic field sensor is set up to acquire a component of a magnetic flux density of a magnetic field, in the direction of the respective at least one measurement axis, the magnetic field being producible when there is a loading of the shaft with a torque by the at least one magnetized region; and
wherein the evaluation unit is configured to acquire at least one measurement signal of the first magnetic field sensor, at least one measurement signal of the second magnetic field sensor, and at least one measurement signal of the third magnetic field sensor, and to determine a torque exerted on the shaft based on the at least one measurement signal of the first magnetic field sensor, the at least one measurement signal of the second magnetic field sensor, the at least one measurement signal of the third magnetic field sensor, and a ratio of a distance between the second magnetic field sensor and the third magnetic field sensor in the axial direction to a distance between the first magnetic field sensor and the second magnetic field sensor in the axial direction.

2. The magnetoelastic torque sensor as recited in claim 1, wherein: (i) the at least one measurement axis of the first magnetic field sensor and/or the at least one measurement axis of the second magnetic field sensor and/or the at least one measurement axis of the third magnetic field sensor each include a measurement axis parallel in the axial direction or the radial direction of the shaft, the at least one measurement signal of the first magnetic field sensor includes a first measurement signal that corresponds to a component of a magnetic flux density of the magnetic field in the axial direction or the radial direction of the shaft at a position of the first magnetic field sensor, and/or the at least one measurement signal of the second magnetic field sensor includes a second measurement signal that corresponds to a component of the magnetic flux density of the magnetic field in the axial direction or the radial direction of the shaft at a position of the second magnetic field sensor, and/or the at least one measurement signal of the third magnetic field sensor includes a third measurement signal that corresponds to a component of the magnetic flux density of the magnetic field in the axial direction or the radial direction of the shaft at the position of the third magnetic field sensor, or (ii) the at least one measurement axis of the first magnetic field sensor and/or the at least one measurement axis of the second magnetic field sensor and/or the at least one measurement axis of the third magnetic field sensor each include two or three measurement axes oriented orthogonally to one another, the at least one measurement signal of the first magnetic field sensor including two or three measurement signals and/or the at least one measurement signal of the second magnetic field sensor including two or three measurement signals and/or the at least one measurement signal of the third magnetic field sensor including two or three measurement signals, a component of the magnetic flux density of the magnetic field in the axial direction or the radial direction of the shaft at a respective position of the magnetic field sensor being determinable from the two or three measurement signals of a respective magnetic field sensor.

3. The magnetoelastic torque sensor as recited in claim 1, wherein the evaluation unit is configured to additionally use a sensitivity of the magnetoelastic torque sensor to determine a torque exerted on the shaft.

4. The magnetoelastic torque sensor as recited in claim 3, wherein the evaluation unit is configured to determine the torque exerted on the shaft using the following equation $$M = \left[ (B_{SE2} - B_{SE3}) - \frac{d_{23}}{d_{12}} \times (B_{SE1} - B_{SE2}) \right] \times s_{13}$$

where:
M is the torque to be determined in "Nm,"
$B_{SE1}$ is the component of the magnetic flux density of the magnetic field in the axial direction or in the radial direction at the position of the first magnetic field sensor in "µT,"

$B_{SE2}$ is the component of the magnetic flux density of the magnetic field in the axial direction or in the radial direction at the position of the second magnetic field sensor in "µT,"

$B_{SE3}$ is the component of the magnetic flux density of the magnetic field in the axial direction or in the radial direction at the position of the third magnetic field sensor in "µT,"

$d_{12}$ is the distance between the first magnetic field sensor and the second magnetic field sensor in "mm,"

$d_{23}$ is the distance between the second magnetic field sensor and the third magnetic field sensor in "mm,"

and $s_{13}$ is a sensitivity of the magnetoelastic torque sensor in "Nm/µT".

5. The magnetoelastic torque sensor as recited in claim 3, wherein the evaluation unit is configured to determine the torque exerted on the shaft using the equation $$M = \left[ (B_{SE2} - B_{SE3}) - k \times \frac{d_{23}}{d_{12}} \times (B_{SE1} - B_{SE2}) \right] \times s_{13}$$

with $0.9 \leq k < 1$ or $1 < k \leq 1.1$
where:
M is the torque to be determined in "Nm,"

$B_{SE1}$ is the component of the magnetic flux density of the magnetic field in the axial direction or in the radial direction at the position of the first magnetic field sensor in "µT,"

$B_{SE2}$ is the component of the magnetic flux density of the magnetic field in the axial direction or in the radial direction at the position of the second magnetic field sensor in "µT,"

$B_{SE3}$ is the component of the magnetic flux density of the magnetic field in the axial direction or in the radial direction at the position of the third magnetic field sensor in "µT,"

$d_{12}$ is the distance (12) between the first magnetic field sensor and the second magnetic field sensor (2) in "mm,"

$d_{23}$ is the distance (23) between the second magnetic field sensor and the third magnetic field sensor (3) in "mm,"

$s_{13}$ is the sensitivity of the magnetoelastic torque sensor in "Nm/µT," and k is a weighting factor.

6. The magnetoelastic torque sensor as recited in claim 1, wherein the first magnetic field sensor, the second magnetic field sensor, and the third magnetic field sensor are situated relative to each other and relative to the at least one magnetized region and the second magnetized region in such a way that one of the following two conditions is satisfied:

$$\left| (N_{SE2} - N_{SE3}) - \frac{d_{23}}{d_{12}} \times (N_{SE1} - N_{SE2}) \right| > 0 \ \mu T \ \text{with} \ \frac{d_{23}}{d_{12}} \leq 1$$

$$\left| (N_{SE1} - N_{SE2}) - \frac{d_{12}}{d_{23}} \times (N_{SE2} - N_{SE3}) \right| > 0 \ \mu T \ \text{with} \ \frac{d_{12}}{d_{23}} < 1,$$

the first magnetic field sensor, the second magnetic field sensor, and the third magnetic field sensor being situated relative to each other and relative to the at least one second magnetized region in such a way that one of the following two conditions is fulfilled:

$$\left| (N_{SE2} - N_{SE3}) - \frac{d_{23}}{d_{12}} \times (N_{SE1} - N_{SE2}) \right| > 50 \ \mu T \ \text{with} \ \frac{d_{23}}{d_{12}} \leq 1$$

$$\left| (N_{SE1} - N_{SE2}) - \frac{d_{12}}{d_{23}} \times (N_{SE2} - N_{SE3}) \right| > 50 \ \mu T \ \text{with} \ \frac{d_{12}}{d_{23}} < 1,$$

where:
$N_{SE1}$ is a predetermined component of the magnetic flux density in "µT" of a magnetic field produced by the at least one magnetized region at a position of the first magnetic field sensor due to a loading of the shaft with a maximum torque measurable by the magnetoelastic torque sensor, $N_{SE2}$ is a predetermined component of the magnetic flux density in "µT" of a magnetic field produced by the at least one magnetized region at a position of the second magnetic field sensor due to a loading of the shaft with the maximum torque measurable by the magnetoelastic torque sensor, and $N_{SE3}$ is a predetermined component of the magnetic flux density in "µT" of a magnetic field produced by the at least one magnetized region at a position of the third magnetic field sensor due to a loading of the shaft with a maximum torque measurable by the magnetoelastic torque sensor.

7. The magnetoelastic torque sensor as recited in claim 1, wherein a sum of the distance between the first magnetic field sensor and the second magnetic field sensor in the axial direction, and the distance between the second magnetic field sensor and the third magnetic field sensor in the axial direction, is greater than or equal to 4 mm and less than 20 mm.

8. The magnetoelastic torque sensor as recited in claim 1, wherein the at least three magnetic field sensors include the first magnetic field sensor, the second magnetic field sensor, the third magnetic field sensor, and a fourth magnetic field sensor, the third magnetic field sensor being situated in the axial direction between the second magnetic field sensor and the fourth magnetic field sensor, the evaluation unit being configured to acquire at least one measurement signal of the fourth magnetic field sensor and to use at least one measurement signal of the fourth magnetic field sensor and a ratio of a distance between the second magnetic field sensor and the third magnetic field sensor in the axial direction to a distance between the third magnetic field sensor and the fourth magnetic field sensor in the axial direction to determine a torque exerted on the shaft.

9. The magnetoelastic torque sensor as recited in claim 8, wherein: (i) the at least one measurement axis of the fourth magnetic field sensor including a measurement axis parallel in the axial direction or the radial direction of the shaft, the at least one measurement signal of the fourth magnetic field sensor including a fourth measurement signal corresponding to a component of the magnetic flux density of the magnetic field in the axial direction or the radial direction of the shaft at the position of the fourth magnetic field sensor, or (ii) the at least one measurement axis of the fourth magnetic field sensor includes two or three measuring axes oriented orthogonally to one another, the at least one measurement signal of the fourth magnetic field sensor including two or three measurement signals from which a component of the magnetic flux density of the magnetic field in the axial direction or the radial direction of the shaft can be determined at a position of the fourth magnetic field sensor.

10. The magnetoelastic torque sensor as recited in claim 8, wherein the evaluation unit is configured to determine the torque exerted on the shaft using the following equation $$M = \left[(B_{SE2} - B_{SE3}) - k \times \frac{d_{23}}{d_{12}} \times (B_{SE1} - B_{SE2}) - (1-k) \times \frac{d_{23}}{d_{34}} \times (B_{SE3} - B_{SE4})\right] \times s_{14}$$

with $0 \leq k \leq 1$
where:
M is the torque to be determined in "Nm,"
$B_{SE1}$ is the component of the magnetic flux density of the magnetic field in the axial direction or in the radial direction at the position of the first magnetic field sensor in "µT,"
$B_{SE2}$ is the component of the magnetic flux density of the magnetic field in the axial direction or in the radial direction at the position of the second magnetic field sensor in "µT,"
$B_{SE3}$ is the component of the magnetic flux density of the magnetic field in the axial direction or in the radial direction at the position of the third magnetic field sensor in "µT,"
$B_{SE4}$ is the component of the magnetic flux density of the magnetic field in the axial direction or in the radial direction at the position of the fourth magnetic field sensor in "µT,"
$d_{12}$ is the distance between the first magnetic field sensor and the second magnetic field sensor in "mm,"
$d_{23}$ is the distance between the second magnetic field sensor and the third magnetic field sensor in "mm,"
$d_{34}$ is the distance between the third magnetic field sensor and the fourth magnetic field sensor in "mm,"
and $s_{14}$ is the sensitivity of the magnetoelastic torque sensor in "Nm/µT," and
k is a weighting factor.

11. The magnetoelastic torque sensor as recited in claim 10, wherein a sum of the distance between the first magnetic field sensor and the second magnetic field sensor in the axial direction, the distance between the second magnetic field sensor and the third magnetic field sensor in the axial direction, and the distance between the third magnetic field sensor and the fourth magnetic field sensor is greater than or equal to 6 mm and less than 20 mm.

12. The magnetoelastic torque sensor as recited in claim 8, wherein the first magnetic field sensor, the second magnetic field sensor, the third magnetic field sensor, and the fourth magnetic field sensor are situated relative to each other and relative to the second magnetized region in such a way that the following condition is satisfied:

$$\left|(N_{SE2} - N_{SE3}) - k \times \frac{d_{23}}{d_{12}} \times (N_{SE1} - N_{SE2}) - (1-k) \times \frac{d_{23}}{d_{34}} \times (N_{SE3} - N_{SE4})\right| > 0 \, \mu T$$

with $0 \leq k \leq 1$
Wherein the first magnetic field sensor, the second magnetic field sensor, the third magnetic field sensor, and the fourth magnetic field sensor are situated relative to each other and relative to the second magnetized region in such a way that the following condition is fulfilled:

$$\left|(N_{SE2} - N_{SE3}) - k \times \frac{d_{23}}{d_{12}} \times (N_{SE1} - N_{SE2}) - (1-k) \times \frac{d_{23}}{d_{34}} \times (N_{SE3} - N_{SE4})\right| > 50 \, \mu T$$

with $0 \leq k \leq 1$
where:
$N_{SE1}$ is a predetermined component of the magnetic flux density in "µT" of a magnetic field produced by the at least one magnetized region at a position of the first magnetic field sensor due to a loading of the shaft with a maximum torque measurable by the magnetoelastic torque sensor,
$N_{SE2}$ is a predetermined component of the magnetic flux density in "µT" of a magnetic field produced by the at least one magnetized region at a position of the second magnetic field sensor due to a loading of the shaft with the maximum torque measurable by the magnetoelastic torque sensor, and
$N_{SE3}$ is a predetermined component of the magnetic flux density in "µT" of a magnetic field produced by the at least one magnetized region at a position of the third magnetic field sensor due to a loading of the shaft with a maximum torque measurable by the magnetoelastic torque sensor,
$N_{SE4}$ is a predetermined component of the magnetic flux density in "µT" of a magnetic field produced by the at least one magnetized region at a position of the fourth magnetic field sensor due to a loading of the shaft with a maximum torque measurable by the magnetoelastic torque sensor.

13. The magnetoelastic torque sensor as recited in claim 1, wherein the shaft has only one magnetized region, the at least three magnetic field sensors being assigned to the magnetized region.

14. The magnetoelastic torque sensor as recited in claim 1, wherein the first magnetic field sensor and the second magnetic field sensor are assigned to the first magnetized region, and the third magnetic field sensor and the fourth magnetic field sensor being assigned to the second magnetized region.

15. A magnetoelastic torque sensor as recited in claim 1, wherein the torque sensor is configured to compensate for homogeneous interference fields and linear interference field gradients in the axial direction of the shaft.

16. A magnetoelastic torque sensor as recited in claim 1, wherein the first magnetized region and the second magnetized region have different magnetization magnitudes.

17. A vehicle, comprising:
a magnetoelastic torque sensor, including:
a shaft having a first magnetized region and a second magnetized region, the first magnetized region and the second magnetized region having opposite magnetizations, and the shaft having an axial direction and a radial direction,
at least three magnetic field sensors, each having at least one measurement axis and being configured to acquire a component of a magnetic flux density of a magnetic field in a direction of the at least one measurement axis, and
an evaluation unit,
wherein the at least three magnetic field sensors include a first magnetic field sensor, a second magnetic field sensor, and a third magnetic field sensor, the second magnetic field sensor being situated in the axial direction between the first magnetic field sensor and the third magnetic field sensor, wherein the first magnetic field sensor and the second magnetic field sensor are assigned to the first magnetized region and the third magnetic field sensor is assigned to the second magnetized region, wherein at least one of the at least three magnetic field sensors is situated relative to the at least one magnetized region in such a way that the at least one magnetic field sensor is set up to acquire a component of a magnetic flux density of a magnetic field, in the direction of the respective at least one measurement axis, the magnetic field being producible when there is a loading of the shaft with a torque by the at least one magnetized region, and wherein the evaluation unit is configured to acquire at least one measurement signal of the first magnetic field sensor, at least one measurement signal of the second magnetic field sensor, and at least one measurement signal of the third magnetic field sensor, and to determine a torque exerted on the shaft based on the at least one measurement signal of the first magnetic field sensor, the at least one measurement signal of the second magnetic field sensor, the at least one measurement signal of the third magnetic field sensor, and a ratio of a distance between the second magnetic field sensor and the third magnetic field sensor in the axial direction to a distance between the first magnetic field sensor and the second magnetic field sensor in the axial direction;

wherein the vehicle being operable electrically and/or with muscular force and having a crank drive, the magnetoelastic torque sensor being situated on the crank drive.

18. A method for determining a torque using a magnetoelastic torque sensor, the magnetoelastic torque sensor including:

a shaft having a first magnetized region and a second magnetized region, the first magnetized region and the second magnetized region having opposite magnetizations, and the shaft having an axial direction and a radial direction, at least three magnetic field sensors, each having at least one measurement axis and being configured to acquire a component of a magnetic flux density of a magnetic field in a direction of the at least one measurement axis, and an evaluation unit, wherein the at least three magnetic field sensors include a first magnetic field sensor, a second magnetic field sensor, and a third magnetic field sensor, the second magnetic field sensor being situated in the axial direction between the first magnetic field sensor and the third magnetic field sensor, wherein the first magnetic field sensor and the second magnetic field sensor are assigned to the first magnetized region and the third magnetic field sensor is assigned to the second magnetized region, wherein at least one of the at least three magnetic field sensors is situated relative to the at least one magnetized region in such a way that the at least one magnetic field sensor is set up to acquire a component of a magnetic flux density of a magnetic field, in the direction of the respective at least one measurement axis, the magnetic field being producible when there is a loading of the shaft with a torque by the at least one magnetized region, and wherein the evaluation unit is configured to acquire at least one measurement signal of the first magnetic field sensor, at least one measurement signal of the second magnetic field sensor, and at least one measurement signal of the third magnetic field sensor, and to determine a torque exerted on the shaft based on the at least one measurement signal of the first magnetic field sensor, the at least one measurement signal of the second magnetic field sensor, the at least one measurement signal of the third magnetic field sensor, and a ratio of a distance between the second magnetic field sensor and the third magnetic field sensor in the axial direction to a distance between the first magnetic field sensor and the second magnetic field sensor in the axial direction, the method comprising the following steps:

acquiring a first measurement signal of the first magnetic field sensor;

acquiring a second measurement signal of the second magnetic field sensor;

acquiring a third measurement signal of the third magnetic field sensor; and determining a torque exerted on the shaft based on the first measurement signal, the second measurement signal, the third measurement signal, and the ratio of the distance between the second magnetic field sensor and the third magnetic field sensor in the axial direction to a distance between the first magnetic field sensor and the second magnetic field sensor in the axial direction.

\* \* \* \* \*